US012810258B2

(12) United States Patent
Choi et al.

(10) Patent No.: US 12,810,258 B2
(45) Date of Patent: Nov. 24, 2026

(54) METHOD, SERVER AND USER TERMINAL FOR PROVIDING VOTE FEATURE THROUGH PROFILE SCREEN

(71) Applicant: KAKAO CORP., Jeju-si (KR)

(72) Inventors: Yoon Jin Choi, Seongnam-si (KR); Seul Gi Kim, Yongin-si (KR)

(73) Assignee: KAKAO CORP., Jeju-si (KR)

( * ) Notice: Subject to any disclaimer, the term of this patent is extended or adjusted under 35 U.S.C. 154(b) by 114 days.

(21) Appl. No.: 18/677,282

(22) Filed: May 29, 2024

(65) Prior Publication Data

US 2024/0420533 A1 Dec. 19, 2024

(30) Foreign Application Priority Data

Jun. 19, 2023 (KR) ........................ 10-2023-0078546

(51) Int. Cl.
*G06Q 10/40* (2026.01)
*G07C 13/00* (2006.01)
*H04L 67/306* (2022.01)

(52) U.S. Cl.
CPC ............. *G06Q 10/40* (2026.01); *G07C 13/00* (2013.01); *H04L 67/306* (2013.01)

(58) Field of Classification Search
None
See application file for complete search history.

(56) References Cited

U.S. PATENT DOCUMENTS 9,274,666 B2 * 3/2016 Shin ........................ G06Q 50/01
10,303,328 B2 * 5/2019 Na ......................... G06F 3/0482
11,146,771 B2 * 10/2021 Ikeda ................... H04N 9/3179
2006/0080284 A1 * 4/2006 Masonis ............... H04L 67/306
(Continued)

FOREIGN PATENT DOCUMENTS

JP 2008-250889 A 10/2008
JP 2011-192195 A 9/2011
(Continued)

OTHER PUBLICATIONS

Office Action received in corresponding Japanese Patent Application No. 2024-083198 dated May 7, 2025.
(Continued)

*Primary Examiner* — Jahed Ali
(74) *Attorney, Agent, or Firm* — Knobbe, Martens, Olson & Bear, LLP

(57) ABSTRACT

Proposed is a method for providing a vote feature. The method may include receiving a request from a first user terminal to post creation information for a poll and a poll interface based on the creation information on a first user's profile screen, the poll interface comprising multiple choices, in response to a request to view the first user's profile screen from a second user terminal, and providing the first user's profile screen containing a poll interface to the second user terminal. The method may also include receiving selection information indicating selection of at least one of the multiple choices from the second user terminal, providing selection completion information to the second user terminal, and in response to a request to view the first user's profile screen from the first user terminal, providing the first user's profile screen containing progress information of the poll to the first user terminal.

14 Claims, 14 Drawing Sheets

(56) References Cited

U.S. PATENT DOCUMENTS

| | | | | |
|---|---|---|---|---|
| 2008/0065701 | A1* | 3/2008 | Lindstrom | G06F 16/258 |
| 2012/0054022 | A1* | 3/2012 | Kosashvili | G06F 16/9038<br>705/14.43 |
| 2013/0036112 | A1* | 2/2013 | Poon | G06F 16/9536<br>707/723 |
| 2013/0227439 | A1* | 8/2013 | Shin | G06F 3/048<br>715/758 |
| 2013/0262582 | A1* | 10/2013 | Houjou | G06Q 50/01<br>709/204 |
| 2015/0051949 | A1* | 2/2015 | Pickton | G06Q 30/0202<br>705/7.31 |
| 2015/0234820 | A1* | 8/2015 | Aravamudan | H04N 21/4826<br>707/769 |
| 2016/0006775 | A1* | 1/2016 | Baldwin | H04L 65/403<br>715/753 |
| 2016/0036737 | A1* | 2/2016 | Atamel | G06F 16/9537<br>715/752 |
| 2016/0241447 | A1* | 8/2016 | Liu | H04L 67/306 |
| 2016/0379314 | A1* | 12/2016 | Trudeau | G06Q 50/01<br>705/319 |
| 2017/0322620 | A1* | 11/2017 | Schmitz | G06F 15/16 |
| 2019/0005520 | A1* | 1/2019 | Nam | H04L 67/10 |
| 2019/0361517 | A1* | 11/2019 | Vasistha | G06F 1/3215 |
| 2021/0118013 | A1* | 4/2021 | Ham | H04L 51/52 |
| 2025/0044914 | A1* | 2/2025 | Cho | G06F 3/0482 |

FOREIGN PATENT DOCUMENTS

| | | | | |
|---|---|---|---|---|
| JP | 2019-091363 | A | 6/2019 | |
| KR | 2012-0072409 | A | 7/2012 | |
| KR | 10-2013-0097970 | A | 9/2013 | |
| KR | 10-2014-0014790 | A | 2/2014 | |
| KR | 10-2019-0002174 | A | 1/2019 | |
| KR | 10-2021-0046171 | A | 4/2021 | |
| WO | WO-2013098830 | A1 * | 7/2013 | G06F 16/958 |
| WO | WO-2017120107 | A2 * | 7/2017 | G06F 3/1423 |

OTHER PUBLICATIONS

Office Action dated Feb. 6, 2025 in Korean Patent Application No. 10-2023-0078546 in 39 pages.

Office Action received in Korean Patent Application No. 10-2023-0078546 dated Jun. 15, 2024.

* cited by examiner

METHOD, SERVER AND USER TERMINAL FOR PROVIDING VOTE FEATURE THROUGH PROFILE SCREEN

CROSS-REFERENCE TO RELATED APPLICATION

This application claims priority to and the benefit of Korean Patent Application No. 10-2023-0078546 filed on Jun. 19, 2023, the disclosure of which is incorporated herein by reference in its entirety.

BACKGROUND

Technical Field

The present disclosure relates to a method for providing a vote feature through a profile screen in a social media or messenger service.

Description of Related Technology

With the recent proliferation of smart devices and advancements in wireless internet technology, social media platforms and messenger services widely offer features that enable users to share their profiles. In addition to basic personal information such as the user's name and contact details, these modern media and messenger services provide functions to share various additional information reflecting the user's experiences, preferences, or tastes.

SUMMARY

The present disclosure provides a feature allowing a poll creator to post a poll interface through a profile screen, and enabling poll participants to access and participate in the poll directly from the profile screen of the poll creator.

The present disclosure aims to efficiently provide other users with notification information associated with the creation and end of a poll through a poll creator's profile screen.

In one aspect of the present disclosure, there is provided a method for providing a vote feature through a profile screen by a server, and the method includes: receiving a request from a first user terminal to post creation information for a poll and a poll interface based on the creation information on a first user's profile screen, wherein the poll interface comprises multiple choices; in response to a request to view the first user's profile screen from a second user terminal, providing the first user's profile screen containing a poll interface to the second user terminal; receiving selection information indicative of selection of at least one of the multiple choices from the second user terminal; providing selection completion information reflecting the selection information to the second user terminal; and in response to a request to view the first user's profile screen from the first user terminal, providing the first user's profile screen containing progress information of the poll to the first user terminal.

The selection completion information may be displayed in place of the poll interface on the first user's profile screen.

The creation information may include at least one of the following: a topic of the poll, information on multiple choices, a poll end point, and information on a position and size of the poll interface on the first user's profile screen.

The first user's profile screen may include a profile picture area and an editable area distinct from the profile picture area, and the poll interface may be displayed in the editable area.

The method may further include: when the poll ends, in response to a request to view the first user's profile screen from the first user terminal, providing the first user's profile screen containing the result information of the poll to the first user terminal; and in response to a request to view details about the result information from the first user terminal, providing voter information about the multiple choices to the first user terminal. The voter information about the multiple choices may be provided only within a predetermined period after the poll ends.

The method may further include, when the poll ends, in response to a request to view the first user's profile screen from a terminal of a user who is a friend with the first user, providing the first user's profile screen containing the result information of the poll to the terminal of the user.

The method may further include: when the poll ends, in response to a request to view the first user's profile screen from the second user terminal, providing the first user's profile screen containing the result information of the poll to the second user terminal; and when the poll ends, in response to a request to view the first user's profile screen from a third user terminal that did not participate in the poll, providing the first user terminal not containing the result information of the poll to the third user terminal.

The method may further include, after the receiving of the request to post the creation information for the poll and the poll interface, providing notification information associated with posting of the poll interface to a terminal of a user who is a friend with the first user.

The notification information may be provided in a form of a profile update notification for the first user.

After the receiving of the request to post the creation information for the poll and the poll interface, notification information associated with a scheduled end of the poll may be provided to a terminal of a user who is a friend with the first user and did not participate in the poll.

The method may further include, when the poll ends, providing notification information associated with the end of the poll to a terminal of at least one user who is a friend with the first user.

The at least one user who is a friend with the first user may be a user who has participated in the poll among users who are friends with the first user.

The notification information may be provided in a form of a profile update notification for the first user.

In another aspect, there is provided a server for providing a vote feature through a profile screen, and the server includes a memory storing instructions and a processor configured to execute the instructions to: receive, from a first user terminal, a request to post creation information for a poll and a poll interface on a first user's profile screen based on the creation information, wherein the poll interface comprises multiple choices; in response to a request to view the first user's profile screen from a second user terminal, provide the first user's profile screen containing a poll interface to the second user terminal; receive selection information indicative of selection of at least one of the multiple choices from the second user terminal; provide selection completion information reflecting the selection information to the second user terminal; and in response to a request to view the first user's profile screen from the first user terminal, provide the first user terminal with the first user's profile screen containing the progress information of the poll, where the selection information is reflected.

In yet another aspect, there is provided a method for providing a vote feature through a profile screen by a user terminal, and the method includes: in response to an interaction to view a poll creator's profile screen, displaying the poll creator's profile screen containing a poll interface, wherein the poll interface comprises multiple choices; receiving a selection interaction indicative of selection of at least one of the multiple choices; and displaying selection completion information reflecting the selection interaction.

The selection completion information may be displayed in place of the poll interface on the poll creator's profile screen.

The method may further include, when the poll ends, in response to an interaction to view the poll creator's profile screen, displaying the poll creator's profile screen containing result information of the poll.

The method may further include, prior to the displaying of the poll creator's profile screen containing the poll interface, displaying notification information associated with the poll interface being posted on the poll creator's profile screen.

The notification information may be displayed corresponding to friend information of the poll creator on a friend list containing friend information of at least one user.

The method may further include, when the poll ends, displaying notification information associated with the end of the poll.

The notification information may be displayed corresponding to friend information of the poll creator on a friend list containing friend information of at least one user.

In yet another aspect, there is provided a user terminal for providing a vote feature through a profile screen, and the user terminal includes a memory storing instructions and a processor configured to execute the instructions to: in response to an interaction to view a poll creator's profile screen, display the poll creator's profile screen containing a poll interface, wherein the poll interface comprises multiple choices; receive a selection interaction indicative of selection of at least one of the multiple choices; and display selection completion information reflecting the selection interaction.

In yet another aspect, there is provided a method for providing a vote feature through a profile screen by a user terminal, and the method includes: providing a server with a request to post creation information for a poll and a poll interface on a user's profile screen, wherein the creation information comprises at least one of the following: a topic of the poll, information on multiple choices, a poll end point, and information on a position and size of the poll interface on the user's profile screen. displaying the user's profile screen containing the poll interface corresponding to the creation information; during the poll, displaying the user's profile screen containing progress information of the poll in response to an interaction to view the user's profile screen; and when the poll ends, displaying the user's profile screen containing result information of the poll in response to an interaction to view the user's profile screen.

The method may further include, in response to an interaction to view details about the progress information or result information, displaying voter information about the multiple choices.

The voter information may be displayed in a form that covers a portion of the user's profile screen.

In another aspect, there is provided a user terminal for providing a poll feature through a profile screen, and the user terminal includes a memory storing instructions and a processor configured to execute the instructions to: provide a server with a request to post creation information for a poll and a poll interface on a user's profile screen, wherein the creation information comprises at least one of the following: a topic of the poll, information on multiple choices, a poll end point, and information on a position and size of the poll interface on the user's profile screen; display the user's profile screen containing the poll interface corresponding to the creation information; during the poll; display the user's profile screen containing progress information of the poll in response to an interaction to view the user's profile screen; and when the poll ends, in response to an interaction to view the user's profile screen, display the user's profile screen containing result information of the poll.

DETAILED DESCRIPTION

Contemporary social media platforms and messenger services offer vote features that enable users to ask for and aggregate opinions on various topics and issues. A poll created by an individual user on a social media or messenger service is exposed to other users, encouraging participation in the poll.

Vote features in social media or messenger services have been typically provided within specific chat rooms or communities. However, with the diversification of user needs on social media and messenger services, there is a growing demand to expose a vote feature in more various ways.

Description will now be given in detail according to exemplary embodiments disclosed herein, with reference to the accompanying drawings. For the sake of brief description with reference to the drawings, the same or equivalent elements may be provided with the same or similar reference numbers, and description thereof will not be repeated. Also, in the description of embodiments, detailed description of well-known related structures or functions will be omitted when it is deemed that such description may cause ambiguous interpretation of the present disclosure.

It will be understood that, although the terms "first," "second," etc. may be used herein to describe various elements, these elements should not be limited by these terms. These terms are generally only used to distinguish one element from another.

As used herein, the singular forms "a", "an," and "the" are intended to include the plural forms as well, unless the context clearly indicates otherwise.

In this application, the described steps may be carried out in any sequence, except in cases where a clearly defined cause-and-effect relationship necessitates a specific order.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinafter, the present disclosure will be described with reference to the attached drawings.

Figure 1:
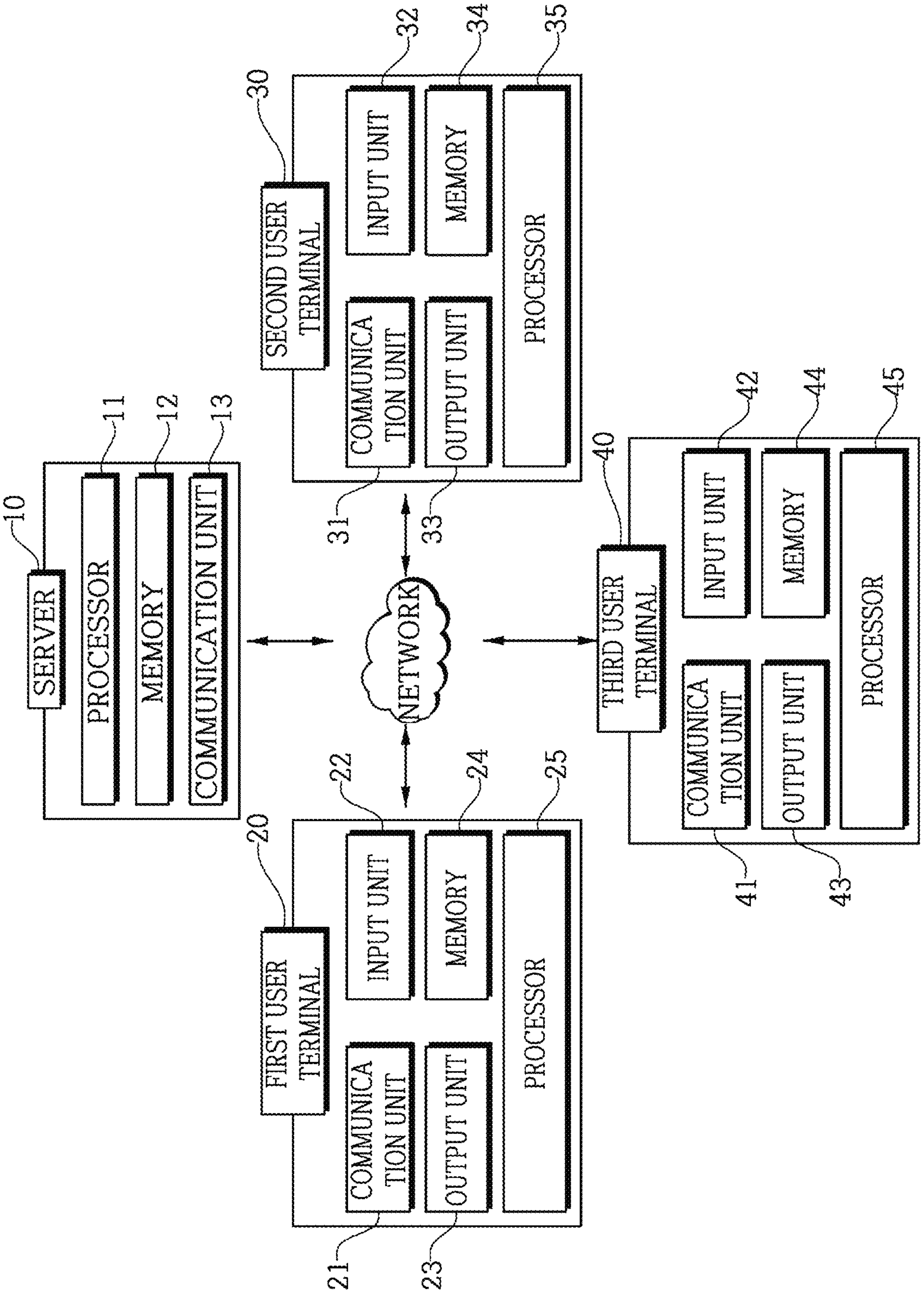
FIG. 1 is a diagram illustrating an example of a network environment according to an embodiment of the present disclosure.

FIG. 1 is a diagram illustrating an example of a network environment according to an embodiment of the present disclosure.

The network environment according to an embodiment of the present disclosure shown in FIG. 1 may include a server 10 and a user terminal. The user terminal may include at least one user terminal connected to the server 10 through a network. In FIG. 1, a first user terminal 20, a second user terminal 30, and a third user terminal 40 are shown as examples of the user terminal.

The first user terminal 20 is a terminal that the first user. The first user terminal 10 refers to a terminal that a first user logs into with the first user's account registered on the server 10, and the second user terminal 20 refers to a terminal that a second user logs into with the second user's account registered on the server 10, and the third user terminal 30 refers to a terminal that a third user logs into with the third user's account registered on the server.

Hereinafter, for convenience of explanation, the first user terminal 20 will be described as the terminal of a poll creator, and the second user terminal 30 will be described as the terminal of a participant in the poll created by the first user terminal 20. The third user terminal 40 will be described as the terminal of a user who did not participate in the poll created by the first user terminal 20. However, the present disclosure does not specify or limit features that can be implemented depending on a user terminal.

Communication schemes for a network is not limited. The communication schemes may include not only a communication scheme to utilize a telecommunication network (for example, a mobile communication network, wired Internet, wireless Internet, and a broadcast network), but also a short-range radio communication scheme.

In the present disclosure, the server 10 may be a device capable of transmitting and receiving information through communication with a user terminal over a network. The server 10 may be implemented as a single computer device or a plurality of computer devices providing commands, codes, files, content, services, etc.

The server 10 may include a processor 11, a memory 12, and a communication unit 13.

The processor 11 controls the overall operation of the memory 12 and the communication unit 13 to provide a voting service to a user terminal and store content. The voting service allows users to participate in a poll created by the first user terminal 20.

The memory 12 functions as a storage medium and may store a number of application programs running on the server 10, and data and commands for operation of the server 10. In one embodiment, an application that provides a social media service or messenger service for sharing a user profile may be stored in the memory 12.

The memory 12 may be provided in the form of any of various hardware storage devices such as an ROM, an RAM, a flash drive, a hard drive, etc. or may be provided in the form of web storage.

The communication unit 13 may communicate with a user terminal in a wired/wireless manner over a network.

The server 10 of the present disclosure can provide a vote feature to a user terminal. Specifically, the server 10 may provide the vote feature through the profile screen.

Users receiving functions or services from the server 10 may be connected through a relationship called "friendship." Friendship may be established by mutual friend requests and acceptances, or by meeting a condition such as at least one party having the other's phone number stored. In some cases, the vote feature may provide services to users who are not friends, but the range of services provided may be more limited compared to those provided to users who are friends.

The server 10 may receive a request from the first user terminal 20 to post creation information for a poll and a poll interface based on the creation information for the poll on the first user's profile screen. Subsequently, the server 10 may respond to viewing requests from the second user terminal 30 for the first user's profile screen by providing the first user's profile screen containing the poll interface to the second user terminal 30. The server 10 may also receive selection information indicating at least one choice selected from multiple choices from the second user terminal 30 and provide the second user terminal 30 with selection completion information reflecting the selection information. In addition, in response to a request from the first user terminal 20 to view the first user's profile screen, the server 10 may provide the first user's profile screen containing progress information of the poll to the first user terminal 20.

When the poll has ended, in response to a request from the first user terminal 20 to view the first user's profile screen, the server 10 may provide the first user terminal 20 with the first user's profile screen containing result information of the poll. In addition, in response to a request from the first user terminal 20 to view details about the result information, the server 10 may provide voter information about multiple choices to the first user terminal 20. In addition, in response to a request from a terminal of a user who is a friend with the first user, the server 10 may provide the terminal of the corresponding user with the first user's profile screen containing result information of the poll.

Here, the poll or survey refers to an act of the first user (poll creator) asking for opinions from other users (poll participants) on a specific topic or issue and solicit responses. In the present disclosure, the first user may enter information about a question (survey) regarding a specific topic or issue, along with multiple choices for selection. The poll participants including the second user may receive information about the poll and select at least one choice from the multiple choices based on the participants' individual opinions.

The server 10 of the present disclosure provide a vote feature through a social media or messenger service provided to a user. Specifically, the server 10 may receive creation information for a poll from the first user terminal 20 and provide the second user terminal 30 with a poll interface generated based on the creation information. The server 10 may provide the poll interface not only to the second user terminal 30 but also to the terminals of other users capable of participating in the poll.

Here, the creation information for the poll refers to information input by the first user to provide to the server 10 when creating the poll. The creation information for the poll may include information about a question (survey), multiple choices, and a display option (such as size, position, color, visual effect, etc.) for the poll interface.

Here, the poll interface refers to interface information provided to the second user terminal 30 by the server 10 to enable participation in the poll. The poll interface may be displayed based on the creation information for the poll provided by the first user terminal 20 to the server 10. Specifically, the poll interface may include information about a question (survey) and multiple choices provided by the first user terminal 20 to the server 10. In addition, the poll interface may be displayed on the second user terminal 30 based on a display option (such as size, position, color, visual effect, etc.) input by the first user.

In the present disclosure, the poll interface may be displayed on the first user's profile screen. Therefore, when the second user requests to view the first user's profile screen, a poll interface included in the first user's profile screen may be provided to the second user terminal 30.

Here, a profile screen refers to an interface provided by the server 10 in a social media or messenger service to display a user' personal information or status information. The profile screen may include the user's name, profile picture, status message, contact information, profile background picture, etc.

Here, the selection information refers to information indicating that the second user has selected at least one choice from the multiple choices included in the poll interface. In response to a selection interaction for any of the multiple choices provided on the poll interface, the second user terminal 30 may provide the server 10 with the selection information.

Here, the selection completion information refers to information provided by the server 10 to the second user terminal 30 when the second user completes voting in the poll (i.e., when the selection information is provided to the server 10). The selection completion information may be based on the second user's selection information. Specifically, the selection completion information may include information on a choice selected by the second user among the multiple choices. In some cases, the selection completion information may include voting information for each of the multiple choices at a current time during the poll.

Here, the progress information of the poll may be information about the number of votes for each of the multiple choices at a current time. The progress information of the poll is information provided by the server 10 to the first user terminal 20. The progress information of the poll may include information such as a start point of the poll, an end point of the poll, the number of participants in the poll at the current time, the number of votes for each of the multiple choices, a percentage of votes for each of the multiple choices, and voter information about the multiple choices. The progress information of the poll may be provided in response to a request to view a profile screen from the user terminal 20.

Here, the result information of the poll refers to information generated when the poll ends, indicating the result of the poll. Specifically, the result information of the poll may include voting information for each of the multiple choices. In some cases, in the present disclosure, the result information of the poll may not include voter information for each of the multiple choices.

The user terminals 20, 30, and 40 include the first user terminal 20 which is a poll creator's terminal, the second user terminal 39 which is a poll participant's terminal, and the third user terminal 40 which did not participate in the poll.

The user terminals 20, 30, and 40 may include communication units 21, 31, and 41, input units 22, 32, and 42, output units 23, 33, and 43, memories 24, 34, and 44, and processors 25, 35, and 45.

The communication units 21, 31, and 41 may communicate with the server 10 or other terminals in a wired/wireless manner.

The input units 22, 32, and 42 may receive various types of information through a user's manipulation and input action. The input units 22, 32, and 42 may be touch screen modules, keyboards, mouses, buttons, cameras, styluses, microphones, etc.

The user terminals 20, 30, and 40 may receive a user's interaction through the input units 22, 32, and 42. An interaction refers to the user's operating an input unit to enter information reflecting the user's selection or intention into a user terminal. For example, the interaction may include touching on a touchscreen, clicking with a mouse, typing on a keyboard, providing voice input through a microphone, capturing an image using a camera, recognizing movements through a motion sensor, and the like.

The output units 23, 33, and 43 may output various information. The output units 23, 33, and 43 may be display devices, speakers, vibration generators, tactile generators, etc. In some cases, each of the output units 23, 33, and 43 may be a device (e.g., Bluetooth earphone) that is connected to the user terminals 10 and 20 through wired or wireless communication (e.g., short-range radio communication such as Bluetooth) to receive and output a signal.

Each of the memories 24, 34, and 44 function as a storage medium and may store a plurality of application programs serve as running on the user terminal 10 and 20 and data and instructions for operating the user terminal 10 and 20. Each of the memories 24, 34, and 44 may be provided in the form of any of various hardware storage devices such as an ROM, an RAM, a flash drive, a hard drive, etc. or may be provided in the form of web storage.

In one embodiment, the memories 24, 34, and 44 may store the application associated with the messenger service, social media service, or social network service (SNS).

The processors 25, 35, and 45 may execute the application associated with the messenger service, social media service, or social network service (SNS) by controlling the overall operation of the communication units 21, 31, and 41, the input units 22, 32, and 42, the output units 23, 33, and 43, and the memories 24, 34, and 44.

The first user terminal 20 may request to post creation information for a poll and a poll interface on a user's profile screen from the server 10, and may display the user's profile screen containing the poll interface based on the creation information. During the poll, the first user terminal 20 may display a user's profile screen containing progress information of the poll in response to an interaction to view the user's profile screen. When the poll ends, the first user terminal 20 may display the user's profile screen containing result information of the poll in response to an interaction to view the user's profile screen.

The second user terminal 30 may display a poll creator's profile screen containing a poll interface in response to an interaction to view the poll creator's profile screen. The second user terminal 30 may receive a selection interaction indicative of selection of at least one of multiple choices and display selection completion information reflecting the selection interaction. When the poll ends, the second user terminal 30 may display a poll creator's profile screen containing result information of the poll in response to an interaction to view the poll creator's profile screen.

The third user terminal 40 may display the poll creator's profile screen containing a poll interface in response to an interaction to view the poll creator's profile screen. The third user terminal 40 may not receive an interaction regarding the multiple choices for participating in the poll from the third user. When the poll ends, the third user terminal 40 may display the poll creator's profile screen containing result information of the poll in response to an interaction to view the poll creator's profile screen.

However, in some cases, because the third user terminal 40 is not a terminal participating in the poll, the third user terminal 40 may, unlike the second user terminal 30, display the poll creator's profile screen not containing the result information of the poll in response to an interaction to view the poll creator's profile screen.

Hereinafter, an example of a method for providing a vote feature through a profile screen by the server 10 of the present disclosure will be described with reference to FIG. 2. The present disclosure provides a method for providing a vote feature through a profile screen by a server in a social media service, social network service (SNS), or messenger service. The vote feature of the present disclosure may be provided through a user's profile screen, unlike chat messages in messenger services or feed messages in social network services.

Figure 2:
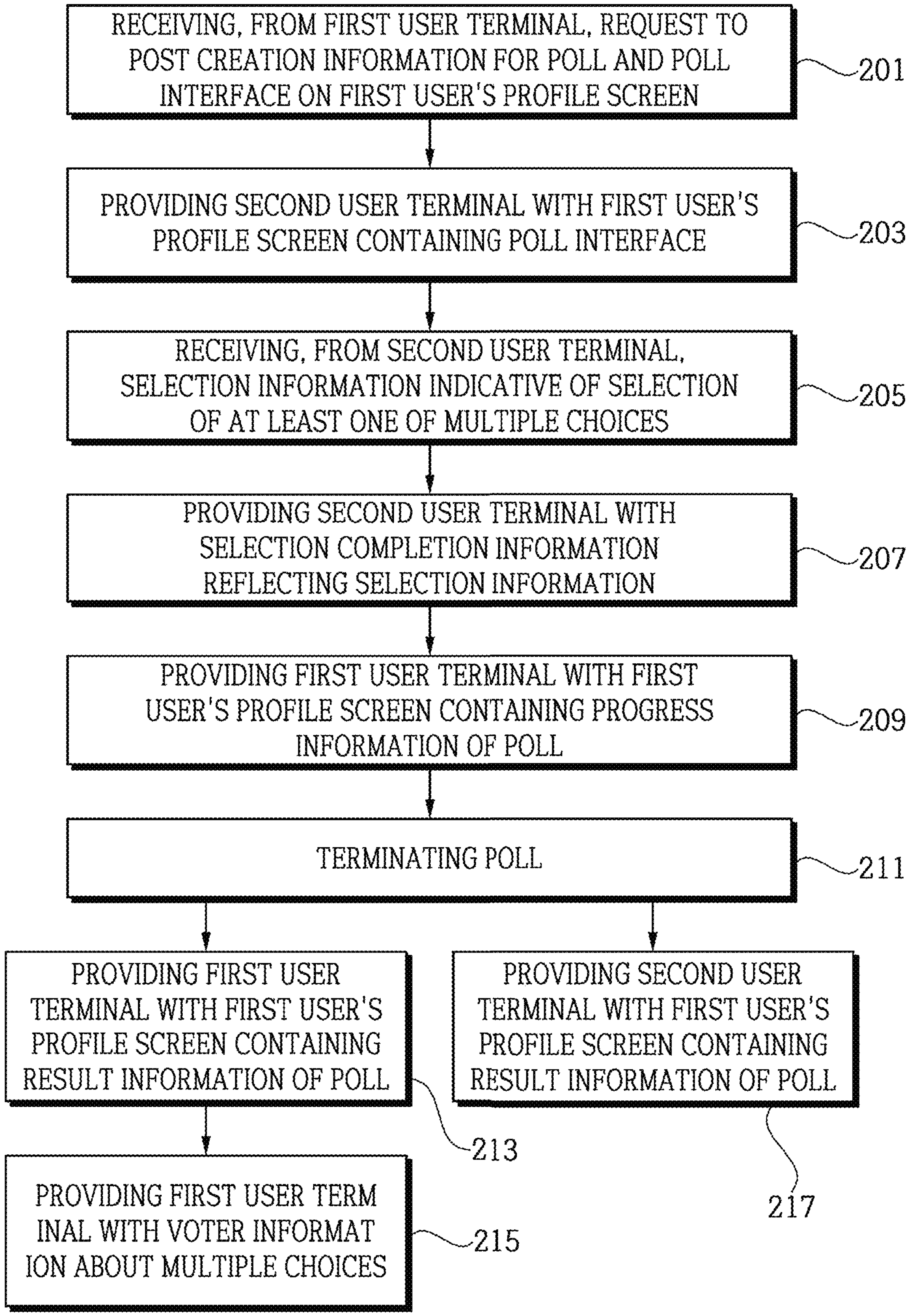
FIG. 2 is a flowchart for explaining how a server of the present disclosure provides a vote feature through a profile screen.

FIG. 2 is a flowchart for explaining a method for providing a vote feature through a profile screen by the server 10 of the present disclosure. First, with reference to FIG. 2, a method for providing a vote feature through a profile screen, involving the server 10, the first user terminal 20, and the second user terminal 30, will be described.

In operation 201, the server 10 receives, from the first user terminal 20, a request to post creation information for a poll and a poll interface based on the creation information on the first user's profile screen.

The creation information for the poll is information input by the first user to be provided to the server 10 when creating the poll. The creation information for the poll input by the first user into the first user terminal 20 may be provided to the server 10.

The first user may input the creation information for the poll through an editing feature on his or her profile screen and request to post the poll interface on his or her profile screen.

Specifically, the creation information for the poll may include information on a question (survey) and multiple choices, and information on a display option (size, position, color, visual effect, etc.) for the poll interface.

The first user may input information on a question (survey) including a text, an image, multimedia information, link information, etc. In addition, the first user may input the number of choices and content of the choices.

In addition, the first user may specify a display option on how to display the poll interface on his or her profile screen. Specifically, the first user may specify the size, position, color, transparency or other visual effect of the poll interface.

To this end, the first user terminal 20 may provide the first user with a setting interface where the first user can specify the size and position at which the poll interface will be displayed. The setting interface may show the first user's profile screen and the poll interface, allowing the first user to change the size and position of the poll interface, thereby specifying the size and position for the poll interface to be posted.

In some cases, the first user may set an end point of the poll, a condition for posting the poll, a condition for participating in the poll, and a condition for disclosing result information of the poll. Such setting information may be included in the creation information for the poll. If the first user does not separately specify the setting information, default settings may be applied.

An editable area where the poll interface is to be positioned on the first user's profile screen may be specified. The editable area may be distinct from a profile picture area of the first user's profile screen. In the setting interface described above, the size and position of the poll interface that the first user can specify may be limited within the editable area. Therefore, the poll interface may be displayed on the first user's profile screen in a form that does not obscure the profile picture.

The server 10 may post the poll interface based on the creation information for the poll, received from the first user terminal 20, on the first user's profile screen. Therefore, the first user and other users may be able to view the poll interface through the first user's profile screen.

If the first user does not set a separate poll starting condition in operation 201, the server 10 may post a poll interface on the first user's profile screen to start the corresponding poll. If the first user sets a separate poll starting condition, the poll may start after the poll start condition is met. Operations 203 to 209 below correspond to the operations performed during a period after the poll starts until the poll ends.

In operation 203, the server 10 provides the first user's profile screen containing the poll interface to the second user terminal 30.

Operation 203 may be performed in response to a request from the second user terminal 30 to view the first user's profile screen. After the server 10 performs operation 201, operation 203 is performed when the second user terminal 30 requests to view the first user's profile screen.

The second user may request to view the first user's profile screen from the server 10 in various ways. For example, the second user may select the first user's profile picture from a friend list or chat room and request to view the first user's profile screen from the server 10.

The server 10 may provide the poll interface, displayed based on the creation information for the poll, through the first user's profile screen. Specifically, the poll interface may be displayed on the first user's profile screen according to a display option (such as size, position, color, visual effect, etc.) set by the first user.

Operation 203 is performed when the second user has not yet participated in the poll created by the first user. If the second user has already participated in the poll prior to operation 203, the server 10 may provide selection completion information reflecting the second user's selection information to the second user terminal 30 in response to a request to view the first user's profile screen from the second user terminal 30. Providing the second user 30 with the selection completion information will be described in detail with reference to operation 207.

In operation 205, the server 10 receives, from the second user terminal 30, the selection information indicative of selection of at least one of multiple choices.

The selection information is information indicating that at least one choice is selected by the second user from among multiple choices included in the poll interface. In response to a selection interaction for any of the multiple choices provided on the poll interface, the second user terminal 30 may provide the server 10 with the selection information.

In some cases, the server 10 may receive a revocation request for the selection information from the second user terminal 30. The revocation request is information on a request for the second user to revoke the selection of a choice. The second user terminal 30 may provide the server 10 with the revocation request in response to the second user's revocation interaction. Specifically, the revocation interaction may be an input for undoing a previously selected choice among the multiple choices included in the poll interface.

A selection interaction may be a different type of interaction that is distinct from the revocation interaction. For example, the selection interaction may be tapping, touching, or clicking on a choice. However, in some cases, the revocation interaction may be long tapping, long touching, or double-clicking, which are distinct from the selection interaction. Upon receiving a revocation interaction for a choice, the second user terminal may display a separate confirmation window for the revocation.

In operation 207, the server 10 provides the second user terminal 30 with selection completion information reflecting the selection information.

The selection completion information is information provided by the server 10 to the second user terminal 30 when the second user completes participation in the poll (i.e., when selection information is provided to the server 10).

The server 10 may provide the second user terminal 30 with the selection completion information through the first user's profile screen. In the second user terminal 30, the selection completion information may be displayed in place of the poll interface on the first user's profile screen in operation 203.

Specifically, the second user terminal 30 may already be displaying the first user's profile screen with the poll interface since operation 203. Then, upon receiving the selection completion information from the server 10 in operation 207, the second user terminal 30 may replace the poll interface on the existing first user's profile screen with the selection completion information.

The selection completion information may be displayed on the second user terminal 30 according to a display option (size, position, color, visual effect, etc.) for the poll interface, which is input by the first user in operation 201. Therefore, the selection completion information displayed on the second user terminal 30 as a result of operation 207 may have the same size and position as the poll interface displayed on the second user terminal 30 as a result of operation 203, with different content.

The selection completion information may be based on the second user's selection information. The selection completion information may include information on a choice selected by the second user among the multiple choices. For example, if the second user selects a third choice out of a total of three choices, the third choice may be displayed differently from the other choices in the selection completion information to indicate that the third choice has been selected by the second user.

In some cases, the selection completion information may include voting information for each of the multiple choices at a current time during the poll. Specifically, the selection completion information may include the number of participants in the poll at the current time, the number of votes for each of the multiple choices at the current time, or a percentage of votes for each of the multiple choices.

In operation 209, the server 10 may provide the first user terminal 20 with the first user's profile screen containing progress information of the poll.

Operation 209 may be performed in response to a request to view a user's profile screen (i.e., the first user's profile screen) from the first user terminal 20. If the first user terminal 20 requests to view the first user's profile screen after the server 10 performs operation 201, operation 209 is performed.

The progress information of the poll may be information about the number of votes for each choice at the current time during the poll. The progress information of the poll is information provided by the server 10 to the first user terminal 20. The progress information of the poll may include information such as a start point of the poll, an end point of the poll, the number of participants in the poll at a current time, the number of votes for each of the multiple choices at the current time, a percentage of votes for each of the multiple choices, and voter information about the multiple choices.

Voter information about the multiple choices is information indicating which participant has selected which choice in the poll. This allows the first user to identify who has selected which choice.

In some cases, the voter information about the multiple choices may be provided in response to a separate request from the first user. In the first user terminal 20, the voter information about the multiple choices may be displayed in a form (modal) that covers a portion of the first user's profile screen.

The progress information of the poll is information provided by the server 10 to a poll creator (the first user) and may differ from the selection completion information provided to a poll participant (the second users) in operation 207.

Specifically, the progress information of the poll may contain more detailed information than the selection completion information. For example, while the selection completion information may only include the percentage of votes for each choice, the progress information of the poll may additionally include information such as the number of participants in the poll, the number of votes for each of the multiple choices, and voter information about the multiple choice.

The server 10 may provide the progress information of the poll through the first user's profile screen. The progress information of the poll may be displayed on the first user terminal 20 according to the display option (size, position, color, visual effect, etc.) for the poll interface, which is input by the first user in operation 201. Therefore, the progress information of the poll displayed on the first user terminal 20 as a result of operation 209 may be displayed in the same size and position as the poll interface displayed on the second user terminal 30 as a result of operation 203, while containing different content.

In operation 211, the server 10 terminates the poll. The server 10 may determine whether a termination condition for the poll is met, and when the termination condition is met, the server 10 may terminate the poll.

In some cases, the first user may directly terminate the poll before a scheduled end of the poll. To this end, the first user terminal 20 may provide an interface associated with terminating the poll through the first user's profile screen.

When the poll is terminated, operations 203 to 209 are no longer performed, and instead operations 213 to 217 are performed.

In operation 213, the server 10 provides the first user terminal 20 with the first user's profile screen containing result information of the poll.

Operation 213 may be performed in response to a request to view the first user's profile screen from the first user terminal 20 when the poll ends. When the poll ends, the first user may check the result information of the poll by viewing his or her profile screen. After the server 10 terminates the poll in operation 211, if the server 10 receives a request from the first user terminal 20 to view the first user's profile screen, operation 213 is performed.

The result information of the poll is information generated when the poll ends, indicating the result of the poll. The result information of the poll may include the number of participants who have participated in the poll at an end point of the poll, the number of votes for each of the multiple choices, or a percentage of votes for each of the multiple choices.

The server 10 may provide the result information of the poll through the first user's profile screen. The result information of the poll may be displayed on the first user terminal 20 according to the display option (size, position, color, visual effect, etc.) for the poll interface, which is input by the first user in operation 201. Therefore, the result information of the poll displayed on the first user terminal 20 as a result of operation 213 may be displayed in the same size and position as the poll interface displayed on the second user terminal 30 as a result of operation 203, while containing different content.

In some cases, contrary to the description of operation 213, when the poll ends, the server 10 may provide the end information or result information of the poll to the first user terminal 20 through a separate chat message or notification message. In such cases, the end information or result information of the poll may not be included in the first user's profile screen, but solely provided through a chat message or notification message. Of course, even in such cases, the server 10 may still provide the first user terminal 20 with the first user's profile screen containing the end information or result information of the poll.

In operation 215, the server 10 provides the voter information about the multiple choices to the first user terminal 20.

Operation 215 may be performed in response to a request from the first user terminal 20 to view details about the result information of operation 213. By applying an interaction for the result information provided as a result of operation 213, the first user may request to view the details about the result information from the server 10. Upon such a request, the server 10 performs operation 215.

The voter information about the multiple choices is information indicating which participant has selected which choice in the poll. This allows the first user to identify who has selected which choice.

On the first user terminal 20, the voter information about the multiple choices may be displayed in a form (modal) that covers a portion of the first user's profile screen. Specifically, in response to the first user's request to view the details, a voter window may appear, covering a portion of the first user's profile screen. Subsequently, based on an interaction with a back interface or a voter window closing interface, the voter window may no longer be displayed and the first user's profile screen may again be displayed unobstructed.

In some cases, operation 215 may only be provided within a predetermined period after the poll ends. For example, in a case where the predetermined period is within 7 days after the poll ends, the server 10 may only provide the voter information to the first user terminal 20 if a request to view details is made within this period. After the period elapses, the first user terminal 20 may not be able to request to view the details, or may provide limited or no voter information in response to such a request. Specifically, after the period elapses, the first user terminal 20 may not be provided with detailed voter information for each choice, but only with the number or percentage of votes for each of the multiple choices.

In operation 217, the server 10 provides the first user's profile screen containing the result information of the poll to the second user terminal 30.

Operation 217 may be performed in response to a request to view the first user's profile screen on the second user terminal 30 when the poll ends. When the poll ends, the second user may be able to check the result information of the poll by viewing the first user's profile screen. After the server 10 terminates the poll in operation 211, operation 217 is performed when a request to view the first user's profile screen is received from the second user terminal 30.

The result information of the poll is information generated when the poll ends, indicating the result of the poll.

In some cases, the result information in operation 217 (information provided to a poll participant) may be different from the result information in operation 213 (information provided to a poll creator).

Specifically, the result information of operation 213 may include more detailed information than the result information of operation 217. For example, while the result information in operation 217 may only include the percentage of votes for each of the multiple choices, the result information of operation 213 may additionally include information such as the number of participants in the poll, the number of votes for each of the multiple choices, or voter information for the multiple choices.

The server 10 may provide the result information of the poll through the first user's profile screen. The progress information of the poll may be displayed on the second user terminal 30 according to the display option (size, position, color, visual effect, etc.) for the poll interface, which is input by the first user in operation 201. Therefore, the progress information of the poll displayed on the second user terminal 30 as a result of operation 217 may be displayed in the same size and position as the poll interface displayed on the second user terminal 30 as a result of operation 203, while containing different content.

However, in some cases, the progress information of the poll displayed on the second user terminal 30 as a result of operation 217 may be displayed in a different form from the poll interface displayed on the second user terminal 30 as a result of operation 203. For example, the progress information of the poll may initially be displayed as a fold icon smaller than the poll interface, then expanded to the same size as the poll interface upon an expand interaction with the fold icon to display detailed information.

Operation 217 may be performed when the second user participates in the poll created by the first user and then the poll ends. In the present disclosure, a third user corresponds to a user who did not participate in the poll. If the third user terminal 40 requests to view the first user's profile screen after the poll ends, whether the server 10 provides the result information to the third user terminal 40 in operation 217 may vary depending on an operational policy of the vote feature or settings by the first user.

Specifically, in the case of application of a policy of providing result information of a poll only to a user who has participated in the poll, if the third user terminal 40 requests to view the first user's profile screen after the poll ends, the server 10 may provide the third user terminal 40 with the first user's profile screen not containing the result information of the poll. However, in the case of application of a policy of providing result information of a poll to all users (or friends of the first user) regardless of each user's participation in the poll, if the third user terminal 40 requests to view the first user's profile screen after the poll ends, the server 10 may provide the first user's profile screen containing the result information to the third user terminal 40 as well as the second user terminal 30.

Specifically, whether the server 10 provides the result information to the third user terminal 40 in operation 217 may be determined by the first user's setting or request. As described above regarding the policy, the first user may set whether to provide the result information of the poll only to user who have participated in the poll or to provide the result information to all users (or friends of the first user) regardless of each user's participation in the poll.

In some cases, the first user may specify a specific user to determine whether to provide the result information of the poll to the specific user. For example, the first user may set to provide the result information of the poll only to users who have participated in the poll, but also to users participating in a specific chat room regardless of each user's participation in the poll.

In some cases, contrary to the description of operation 217, when the poll ends, the server 10 may provide end information or result information of the poll to terminals of poll participants (including the second user) through a separate chat message, speech bubble, or notification message. In such cases, the end information or result information of the poll may not be included in the first user's profile screen, but solely provided through a chat message or notification message. Of course, even in such cases, the server 10 may still provide the first user's profile screen containing the end information or result information of the poll to the terminals of the poll participants.

Here, in order to provide the end information or result information of the poll in the form of a chat message, there may be an existing chat room where chat messages are provided. The chat room may be a chat room with the first user or a chat room with a chatbot.

Also, in some cases, when the poll ends, the server 10 may share the end information or result information of the poll with a specific user upon a request from the first user. The shared end information or result information of the poll may be displayed in the form of a chat message or speech bubble on the terminal of the specific user.

Hereinafter, an example of a method for providing a vote feature through a profile screen by the server 10 as described with reference to FIG. 2 will be described with reference to FIGS. 3 to 10.

FIGS. 3 to 10 exemplarily show screens in the process of performing a method for providing a vote feature by the first user terminal 20 or the second user terminal 30 according to embodiments of the present disclosure.

Figure 3:
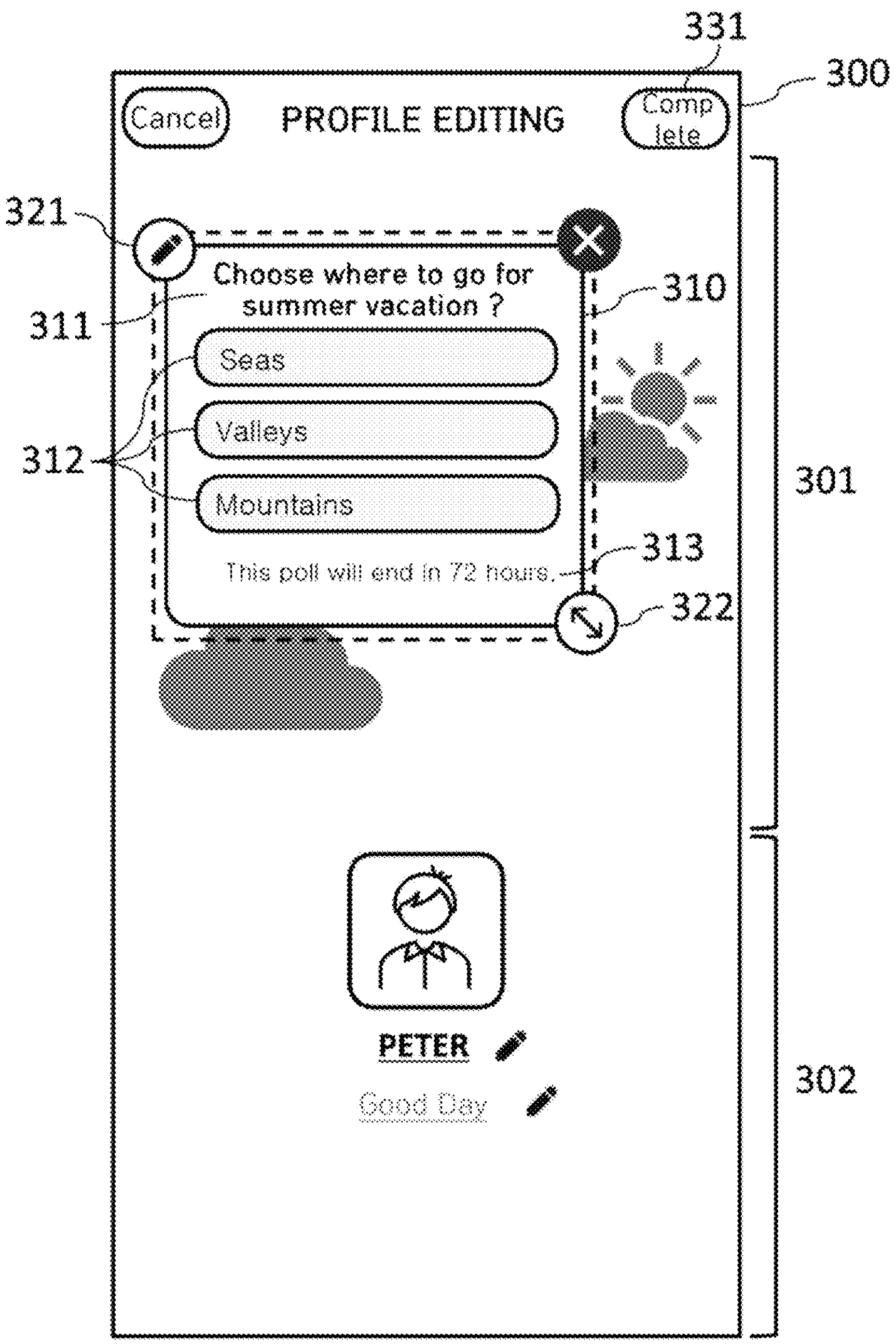
FIGS. 3 to 10 illustrate example screens in a process of implementing a method for providing a vote feature by a first user terminal or a second user terminal according to embodiments of the present disclosure.

FIG. 3 shows a screen where the first user terminal 20 provides a setting interface for the vote feature in order for the server 10 to perform operation 201 of FIG. 2.

Referring to FIG. 3, the first user terminal 20 may display a screen 300 for editing his or her profile. The profile screen may include an editable area 301 where a poll interface 310 can be displayed, as well as a basic information area 302 where a profile picture, a user name, and a status message are displayed. The editable area 301 and the basic information area 302 may be distinguished from each other and do not overlap. In FIG. 3, the poll interface 310 may be sized and positioned to be displayed only in the editable area 301.

Referring to FIG. 3, the first user terminal 20 provides an interface which allows the first user to input creation information for a poll. Specifically, through an input editing interface 321, the first user may enter information about a poll question (survey) 311 and multiple choices 312. In addition, the first user may enter information 313 about an end point of the poll.

In addition, through a size setting interface 322, the first user may set the size of the poll interface 310, etc. Specifically, the size or rotation of the poll interface 310 may be set through the size setting interface 322.

In addition, the first user may change the position of the poll interface 310 by touching or clicking and dragging the poll interface 310. Using such a position change feature, the first user terminal 20 may allow moving the poll interface 310 only within the editable area 301.

In addition, although not shown in the drawing, the first user may also set the transparency or color of the poll interface.

When the first user inputs an interaction with a completion interface 331, the first user terminal 20 sends a request to the server 10 to post an interface on the first user's profile screen based on the creation information.

Figure 4:
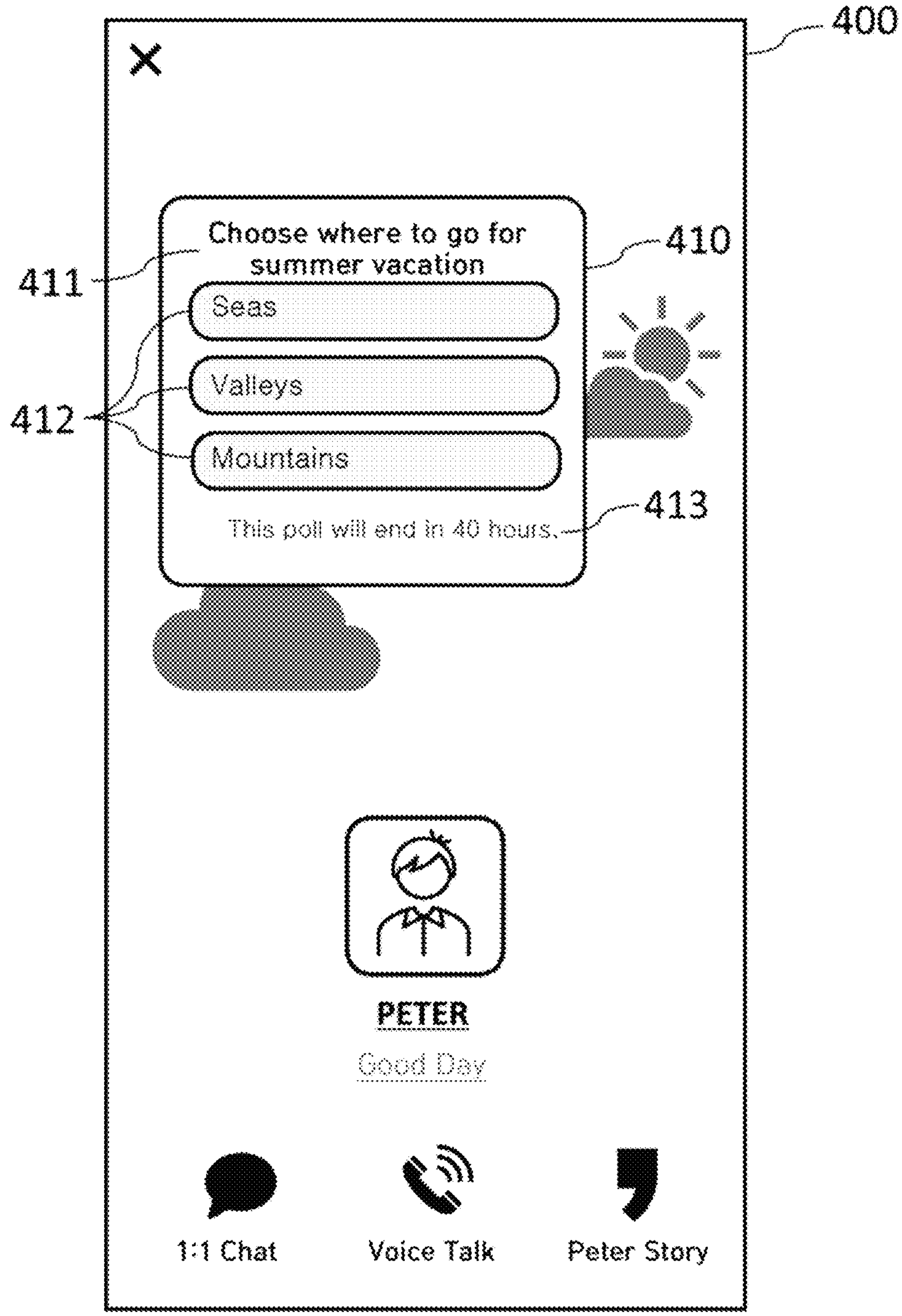

FIG. 4 illustrates that the second user terminal 30 displays the first user's profile screen containing the poll interface as the server 10 performs operation 203 of FIG. 2. FIG. 4 may correspond to a case where the first user's profile screen is displayed on the second user terminal 30 in response to a request from the second user terminal 30 to view the first user's profile screen.

Referring to FIG. 4, the second user terminal 30 may display the first user's profile screen 400. On the first user's profile screen 400, a poll interface 410 may be displayed.

The poll interface 410 may be displayed according to the display option set by the first user in FIG. 3. The poll interface 410 may include a poll question (survey) 411 and interfaces 412 for multiple choices. In some cases, the poll interface 410 may include information 413 about an end point of the poll.

While displaying the screen as shown in FIG. 4, the second user terminal 30 may receive a selection interaction indicative of selection of at least one of the interfaces 412 for the multiple choices from the second user. While displaying the screen as shown in FIG. 4, if a selection interaction is input, the second user terminal 30 may change the first user's profile screen to the screen of FIG. 5.

Figure 5:
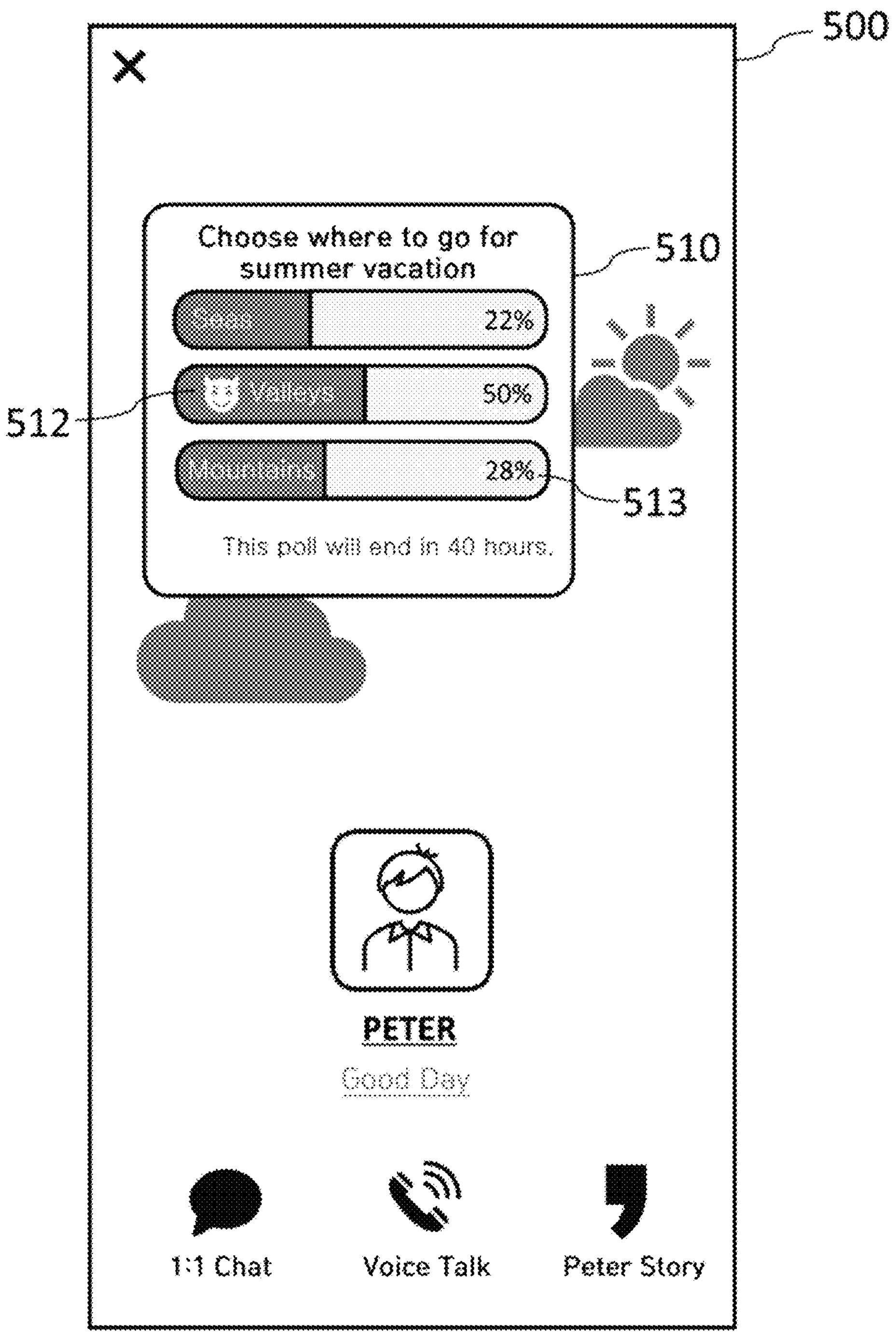

FIG. 5 illustrates that the second user terminal 30 displays the first user's profile screen containing selection completion information as the server 10 performs operation 207 of FIG. 2.

Referring to FIG. 5, the second user terminal 30 may display the first user's profile screen 500 including selection completion information 510.

The selection completion information 510 of FIG. 5 may be displayed in place of the poll interface 410 of FIG. 4. The selection completion information 510 may be displayed according to the display option set by the first user in FIG. 3. Therefore, the selection completion information 510 of FIG. 5 may be displayed in the same size and position as the poll interface 410 of FIG. 4.

The selection completion information 510 may show selection information indicative of selection of at least one of the multiple choices that the second user has selected. Referring to FIG. 5, it can be seen that selection information is displayed by featuring the second user's profile picture 512 alongside a second choice.

In addition, the selection completion information 510 may include voting information 513 for each of the multiple choices. Referring to FIG. 5, the percentage of votes 513 is displayed as voting information for each of the multiple choices.

Figure 6:
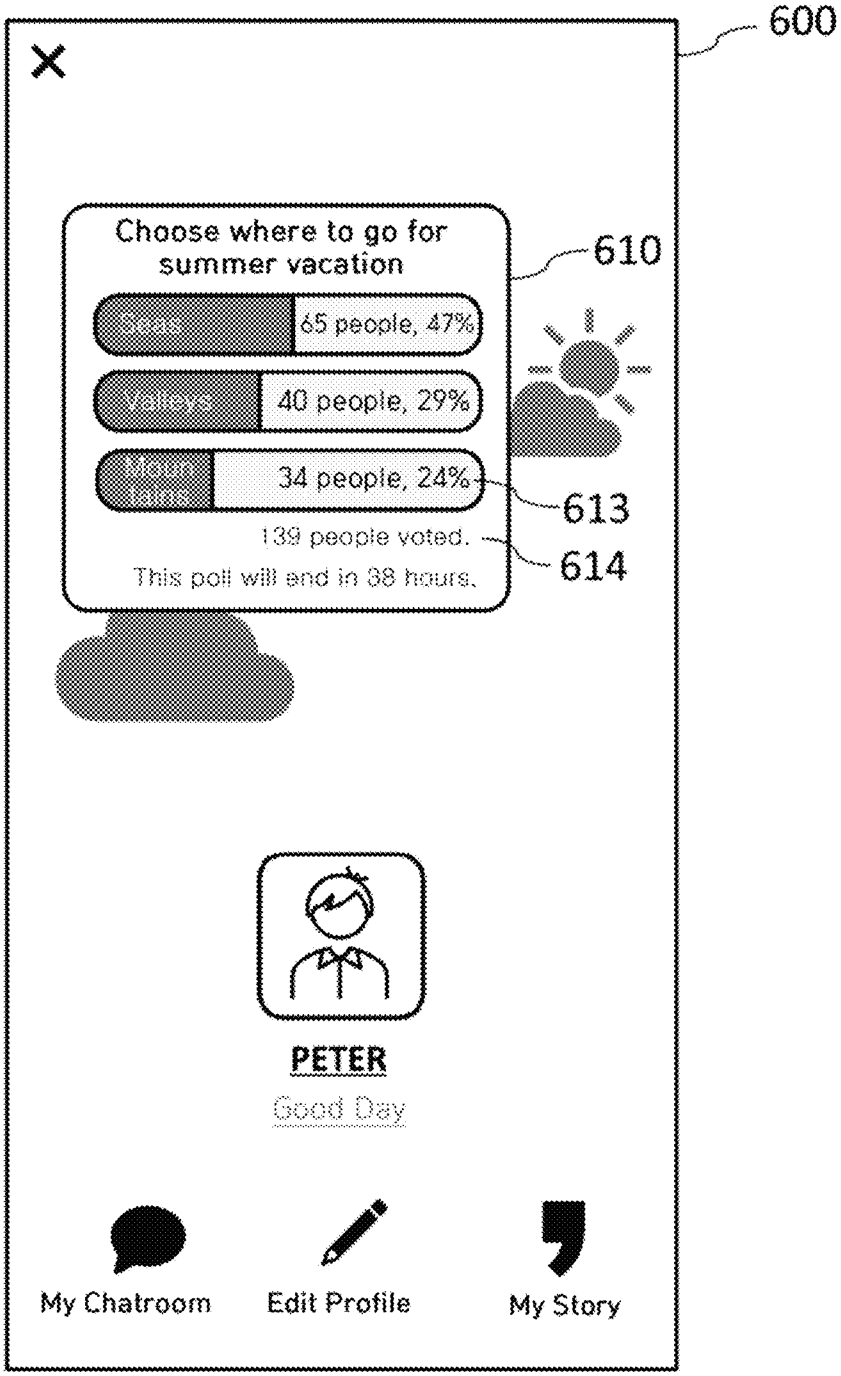

FIG. 6 illustrates that the first user terminal 20 displays a first user's profile screen containing progress information of a poll as the server 10 performs operation 209 of FIG. 2. FIG. 6 may correspond to a case where the first user's profile screen is displayed on the first user terminal 20 in response to a request from the first user terminal 20 to view the first user's profile screen.

Referring to FIG. 6, the first user terminal 20 may display the first user's profile screen 600 including progress information 610 of the poll.

The progress information 610 of the poll may be displayed according to the display option set by the first user in FIG. 3. Therefore, the progress information 610 of the poll in FIG. 6 may be displayed in the same size and position as the poll interface 410 of FIG. 4.

The progress information of the poll 610 may include voting information 613 for each of the multiple choices. The progress information 610 of the poll in FIG. 6 may include more detailed information than the selection completion information 510 of FIG. 5. Referring to FIG. 6, the progress information 610 of the poll may include, but is not limited to, the number and percentage of votes 613 for each of the multiple choices, as well as information about poll participants 614.

Figure 7:
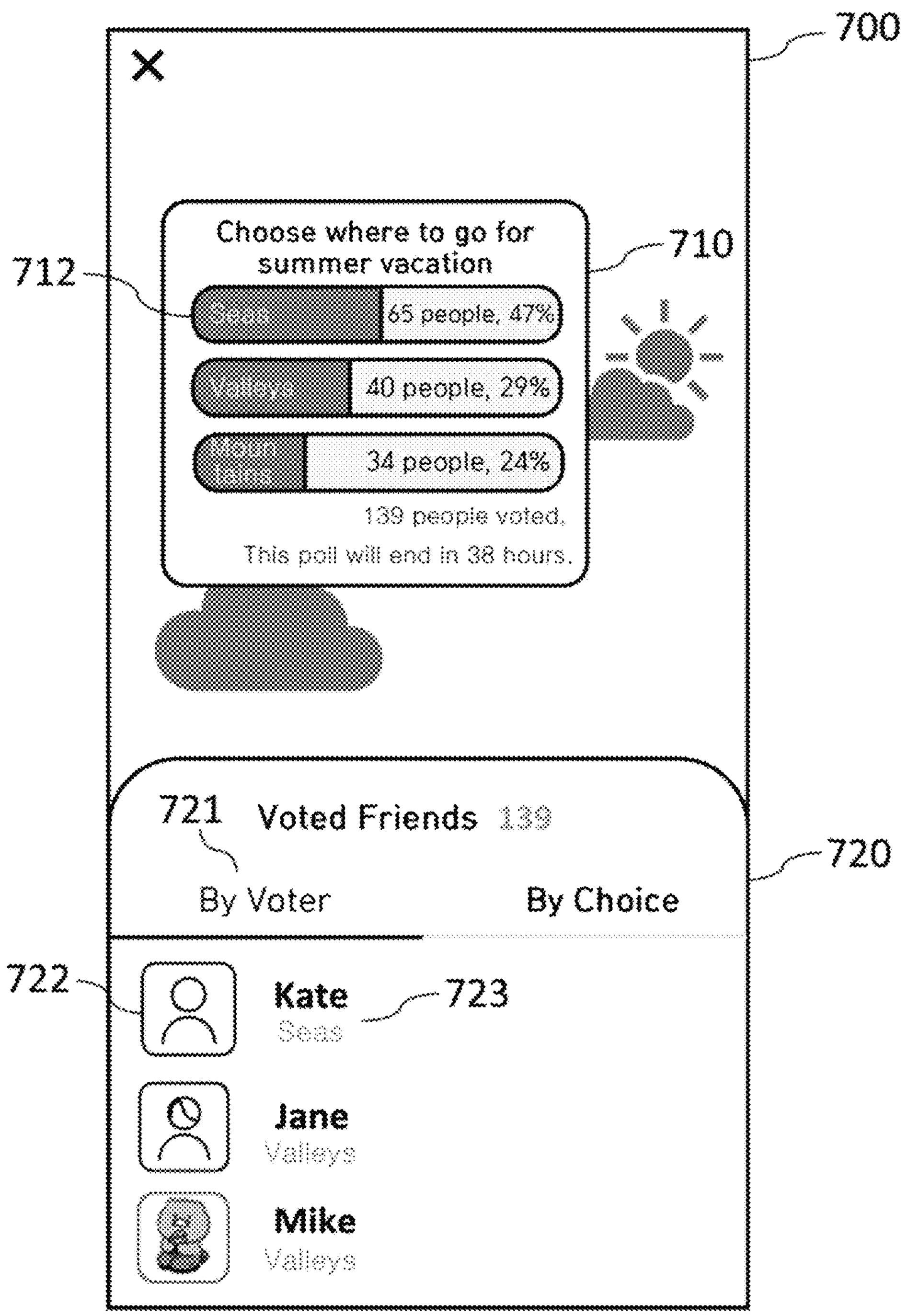

FIG. 7 illustrates that the first user terminal 20 additionally displays voter information about multiple choices after displaying the screen of FIG. 6.

The first user terminal 20 may receive an interaction requesting voter information about multiple choices while displaying the screen of FIG. 6. For example, the interaction requesting the voter information may be the first user's interaction with a choice 712 among progress information 710 of a poll. The first user terminal 20 may display the screen of FIG. 7 in response to receiving the interaction requesting voter information.

In some cases, operation 215 of displaying the screen of FIG. 7 may be provided only within a predetermined period after the poll ends. For example, in a case where the predetermined period is within 7 days when the poll ends, the screen of FIG. 7 may only be displayed if the first user terminal 20 receives an interaction requesting the voter information within the corresponding period.

Referring to FIG. 7, the first user terminal 20 may display the voter information about the multiple choices through a new window 720 that covers a portion of the lower part of the first user's profile screen 700.

The voter information about the multiple choices may be displayed in various ways (such as "By Voter" and "By Choice"). Referring to FIG. 7, the first user terminal 20 may display the voter information about the multiple choices "By Voter" 721, presenting each voter's profile information 722 and voting information 723.

Figure 8:
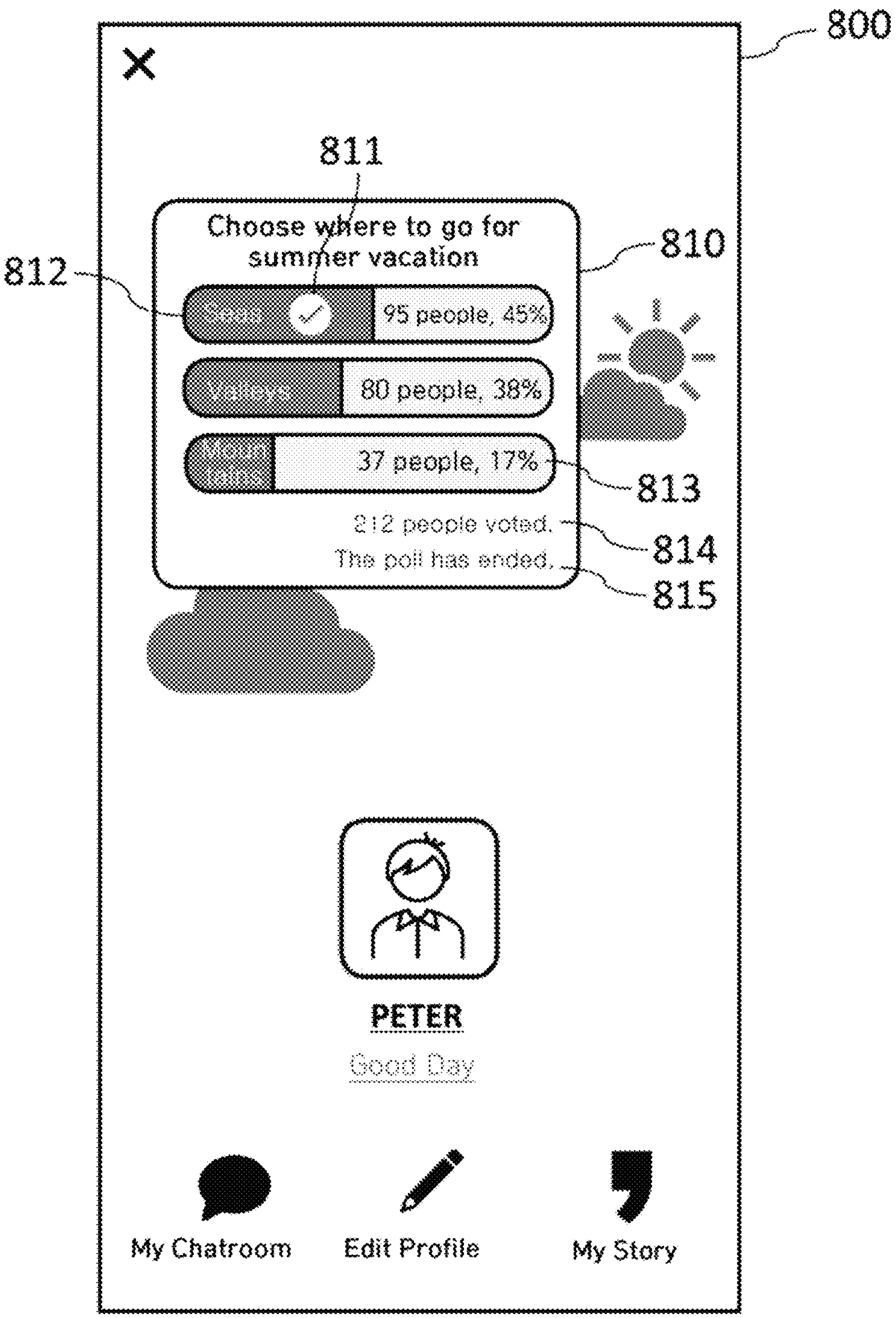

FIG. 8 illustrates that the first user terminal 20 displays a first user's profile screen containing result information of a poll as the server 10 performs operation 213 of FIG. 2. FIG. 8 may correspond to a case where the first user's profile screen is displayed on the first user terminal 20 in response to a request from the first user terminal 20 to view the first user's profile screen after a poll ends.

Referring to FIG. 8, the first user terminal 20 may display the first user's profile screen 800 including result information 810 of a poll. The result information 810 of the poll may include information 815 indicating that the poll has ended.

The result information 810 of the poll may be displayed according to the display option set by the first user in FIG. 3. Therefore, the result information 810 of the poll in FIG. 8 may be displayed in the same size and position as the poll interface 410 of FIG. 4.

The result information 810 of the poll may include a distinction mark 811 indicating a final most voted choice 812 in the poll. In addition, the result information of the poll 810 may include voting information 813 for each of the multiple choices. Specifically, the voting information 813 may include the percentage and number of votes for each of the multiple choices. In addition, the result information 810 of the poll in FIG. 8 may include poll participant information 814.

Figure 9:
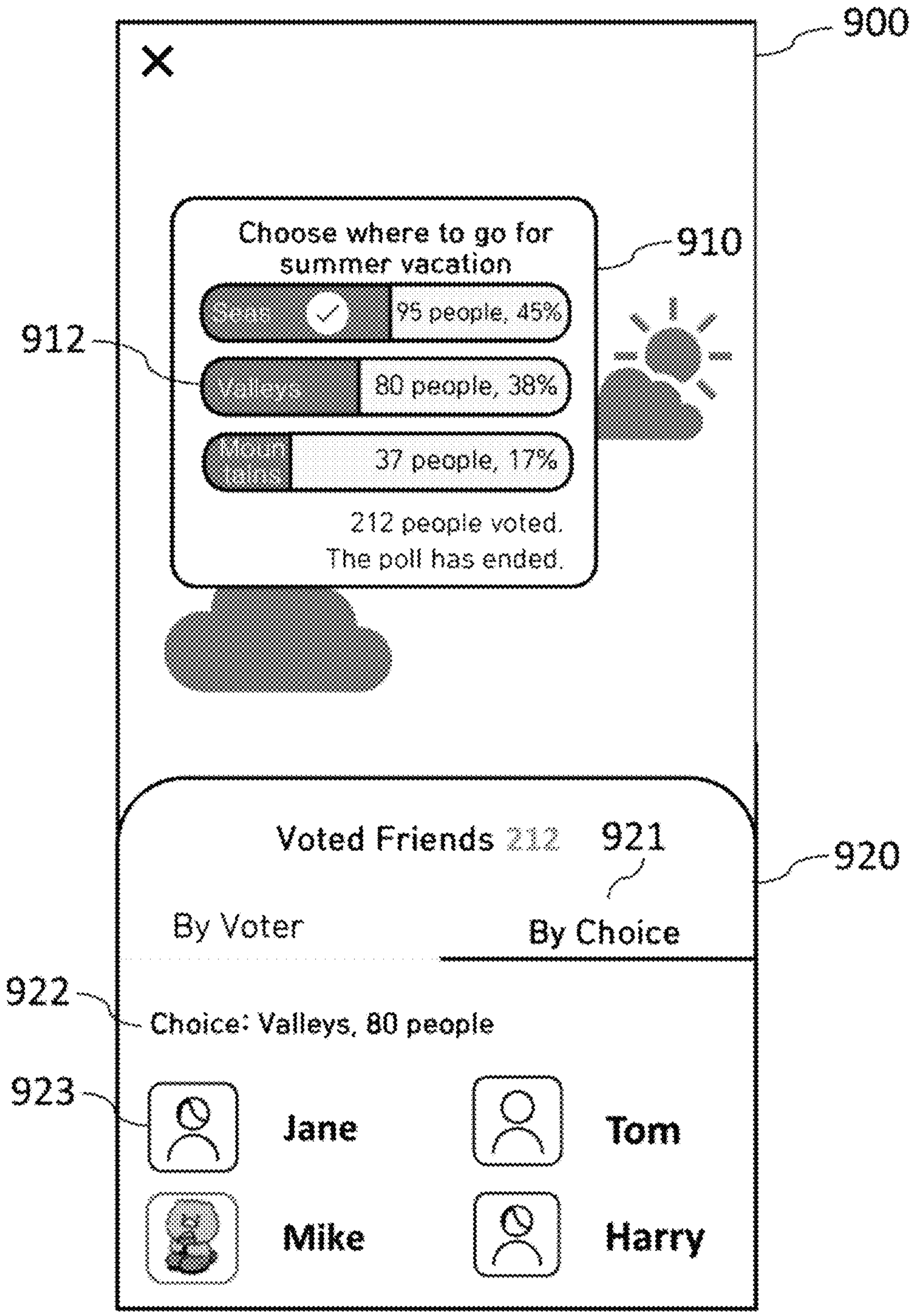

FIG. 9 illustrates that the first user terminal 20 displays the first user's profile screen containing voter information about multiple choices as the server 10 performs operation 215 of FIG. 2.

While displaying the screen of FIG. 8, the first user terminal 20 may receive an interaction requesting voter information about multiple choices. For example, the interaction requesting the voter information may be an interaction made by the first user with one choice 912 among result information 910 of the poll. The first user terminal 20 may display the screen of FIG. 9 in response to receiving the interaction requesting voter information.

Referring to FIG. 9, the first user terminal 20 may display the voter information about the multiple choices through a new window 920 that covers a portion of the lower part of the first user's profile screen 900.

The voter information about the multiple choices may be displayed in various ways (such as "By Voter" and "By Choice"). Referring to FIG. 9, the first user terminal 20 may display the voter information about the multiple choices "By Choice" 921, presenting information 922 about the selected choice and profile information 923 of a voter.

Figure 10:
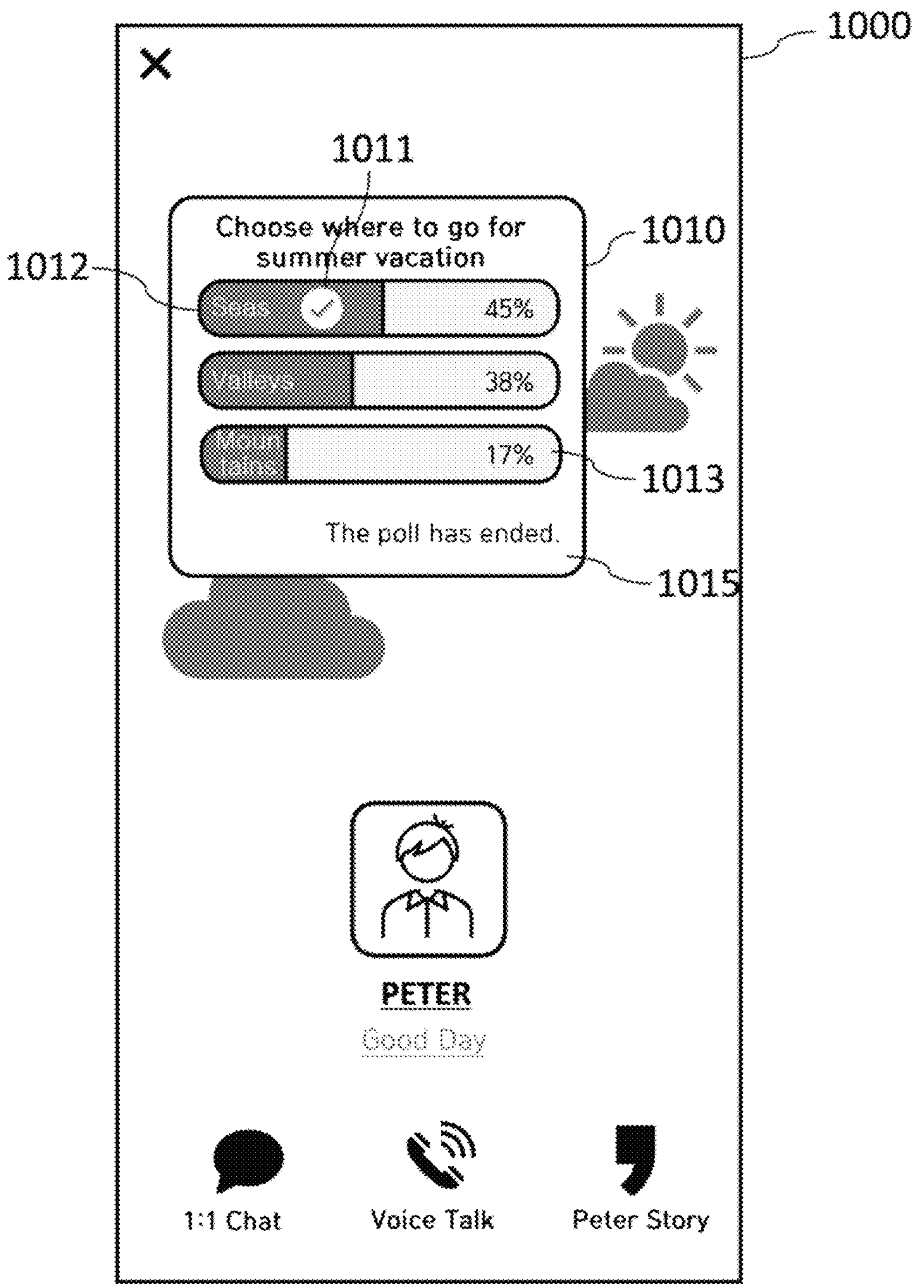

FIG. 10 illustrates that the second user terminal 30 displays the first user's profile screen containing result information of a poll as the server 10 performs operation 217 of FIG. 2. FIG. 10 may correspond to a case where the first user's profile screen is displayed on the second user terminal 30 in response to a request from the second user terminal 30 to view the first user's profile screen after the poll ends.

Referring to FIG. 10, the first user terminal 20 may display the first user's profile screen 1000 containing result information 1010 of the poll. The result information 1010 of the poll may include information 1015 indicating that the poll has ended.

The result information 1010 of the poll may be displayed according to the display option set by the first user in FIG. 3. Therefore, the result information 1010 of the poll in FIG. 10 may be displayed in the same size and position as the poll interface 410 of FIG. 4.

The result information 1010 of the poll may include a distinction mark 1011 indicating a final most voted choice 1012. In addition, the result information 1010 of the poll may include voting information 1013 for the multiple choices. Specifically, the voting information 1013 may include the percentage of votes for each of the multiple choices.

The result information 1010 of the poll of FIG. 10 may omit some information compared to the result information 810 of the poll in FIG. 8. Referring to FIG. 10, the result information 1010 of the poll of FIG. 10 omits the number of votes for each of the multiple choices, which is included in the result information 810 of the poll in FIG. 8.

FIG. 10 may represent a screen displayed on the third user terminal 40 in the case of application of a policy of providing result information of a poll to all users (or friends of the first user) regardless of each user's participation in the poll. If the third user terminal 40, which did not participate in the poll, requests to view the first user's profile screen after the poll ends, the server 10 may provide the third user terminal 40 with the first user's profile screen containing the result information of the poll.

Hereinafter, with reference to FIG. 11, it will be described how to provide notification information regarding a poll in a method for providing a vote feature through a profile screen by the server 10 of the present disclosure.

Figure 11:
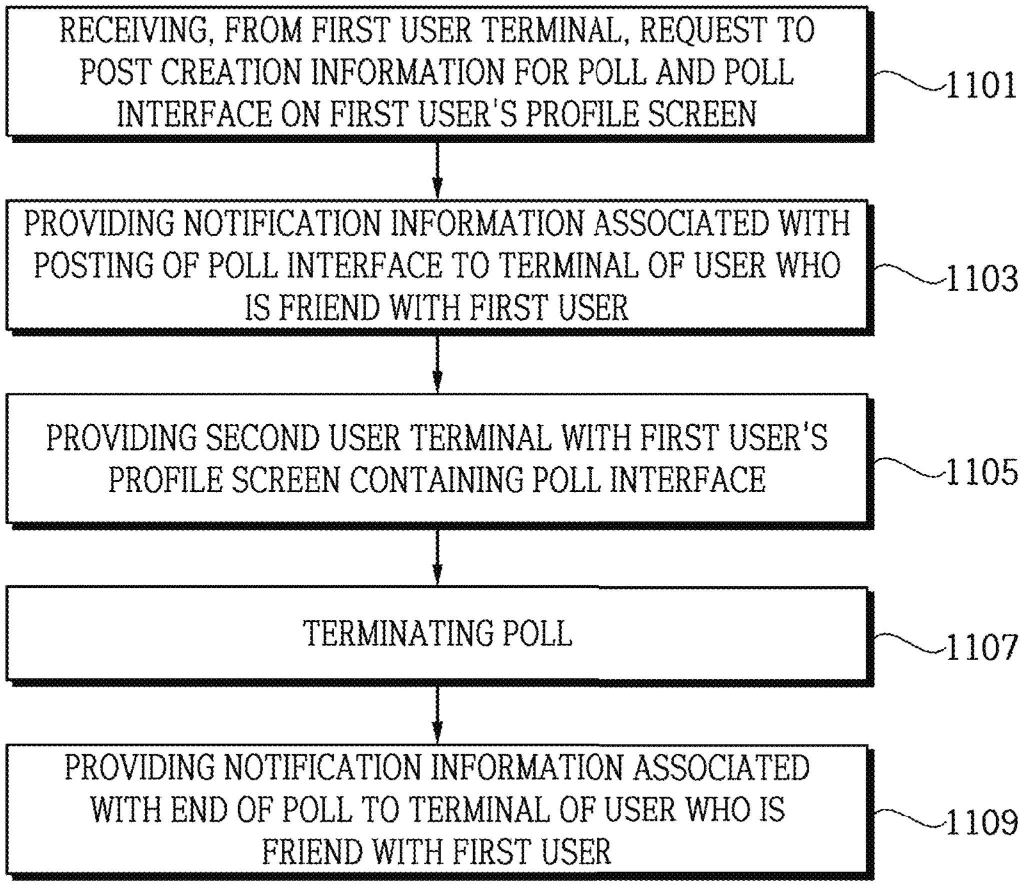
FIG. 11 is a flowchart for explaining how a server of the present disclosure provides notification information about voting in a method for providing a vote feature through a profile screen.

FIG. 11 is a flowchart illustrating how to provide notification information regarding a poll in a method for providing a vote feature through a profile screen by the server 10 of the present disclosure.

For convenience of explanation, a detailed description of operations in FIG. 11 substantially identical to operations in FIG. 2 will be omitted in favor of the description of FIG. 2. Specifically, operations 1101, 1105, and 1107 in FIG. 11 are substantially identical to operations 201, 203, and 211 of FIG. 2, respectively.

In operation 1103, the server 10 provides notification information associated with posting of a poll interface to a terminal of a user who is a friend with the first user. Here, the second and third users are described as users who are friends with the first user.

When profile information of a user is updated, the server 10 may provide a profile update notification to a different user who is a friend with that user. The profile update notification may be displayed for a user whose profile information has been updated, within a friend list of the different user. Specifically, the profile update notification may be displayed as an update notification icon adjacent to a profile picture of the user whose profile information has been updated, within the friend list of the different user.

When the server 10 receives a request from the first user in operation 1101 to post the poll interface on the first user's profile screen, the server 10 may recognize the posting of the poll interface as an update to the first user's profile screen. Consequently, in operation 1103, the server 10 may provide notification information associated with the posting of the poll interface on a terminal of a user who is a friend with the first user. Such notification information may be provided in the form of a profile update notification for the first user.

Through this profile update notification, the different user who is a friend with the first user may be notified that the first user has created a poll and posted the poll on his or her profile screen.

In operation 1105, the server 10 provides the second user terminal 30 with the first user's profile screen containing the poll interface.

Operation 1105 may be performed in response to a request to view the first user's profile screen from the second user terminal 30 after operation 1103. In contrast, in this embodiment, it is described that the third user terminal 40 does not request to view the first user's profile screen after operation 1103.

In such a case, the second user terminal 30 may no longer display the profile update notification for the first user because the second user has checked the updated content of the first user's profile. However, the third user terminal 40 may continue to display the profile update notification for the first user because the third user has not checked the update content of the first user's profile.

In some cases, after operation 1103, the server 10 may provide notification information associated with a scheduled end of the poll to a terminal of a user who is a friend with the first user but has not yet participated in the poll. In some cases, such notification information associated with the scheduled end may be provided based on setting by the first user.

For example, if the notification information associated with the scheduled end is set to be provided 6 hours before the end of the poll, the server 10 may provide the notification information, encouraging poll participation and indicating that the poll will end soon, to a terminal of a user who is a friend with the first user and has not yet participated in the poll.

The notification information associated with the scheduled end of the poll may be provided in the form of a profile update notification or a separate chat message. In some cases, the notification information associated with the scheduled end may be displayed in the form of a separate posting interface (sticker) on the first user's profile screen. For example, information such as "3 hours left until the end of the poll" may be displayed adjacent to the poll interface.

In some cases, the server 10 may provide the notification information associated with the scheduled end of the poll only to users who have not yet participated in the poll among friends with the first user and meet a condition. For example, the server 10 may provide the notification information associated with the scheduled end of the poll to a user who has received notification information in operation 1103 among users who are friends with the first user, and has consequently viewed the first user's profile screen containing the poll interface but has not yet participated in the poll.

When the server 10 terminates the poll in operation 1107, the server 10 provides the notification information associated with the end of the poll to a terminal of a user who is a friend with the first user in operation 1109.

When the poll created by the first user ends and result information of the poll is posted on the first user's profile screen, the server 10 may recognize the posting of the result information of the poll as an update to the first user's profile screen. Accordingly, in operation 1109, the server 10 may provide notification information associated with the fact that the poll has ended and the result information of the poll has been posted to the terminal of the user who is a friend with the first user.

Such notification information may be in the form of a profile update notification for the first user. Accordingly, the notification information in operation 1103 may be displayed in the same form as the notification information in operation 1109.

In some cases, in operation 1109, the server 10 may provide the notification information associated with the end of the poll only to the terminal of a user who has participated in the poll among users who are friends with the first user. In such cases, in operation 1109, the server 10 provides notification information associated with the end of the poll to the second user terminal 30, but not to the third user terminal 40.

In some cases, the poll may end not because the poll's end point has been reached, but because the first user enters an input to delete the poll. In such cases, the update may not be recognized as an update to the first user's profile screen. Therefore, the server 10 may not provide separate update-related notification information.

Hereinafter, an example of how to provide notification information regarding a poll in the method for providing a vote feature through a profile screen by the server 10 described with reference to FIG. 11 will be described with reference to FIG. 12.

Figure 12:
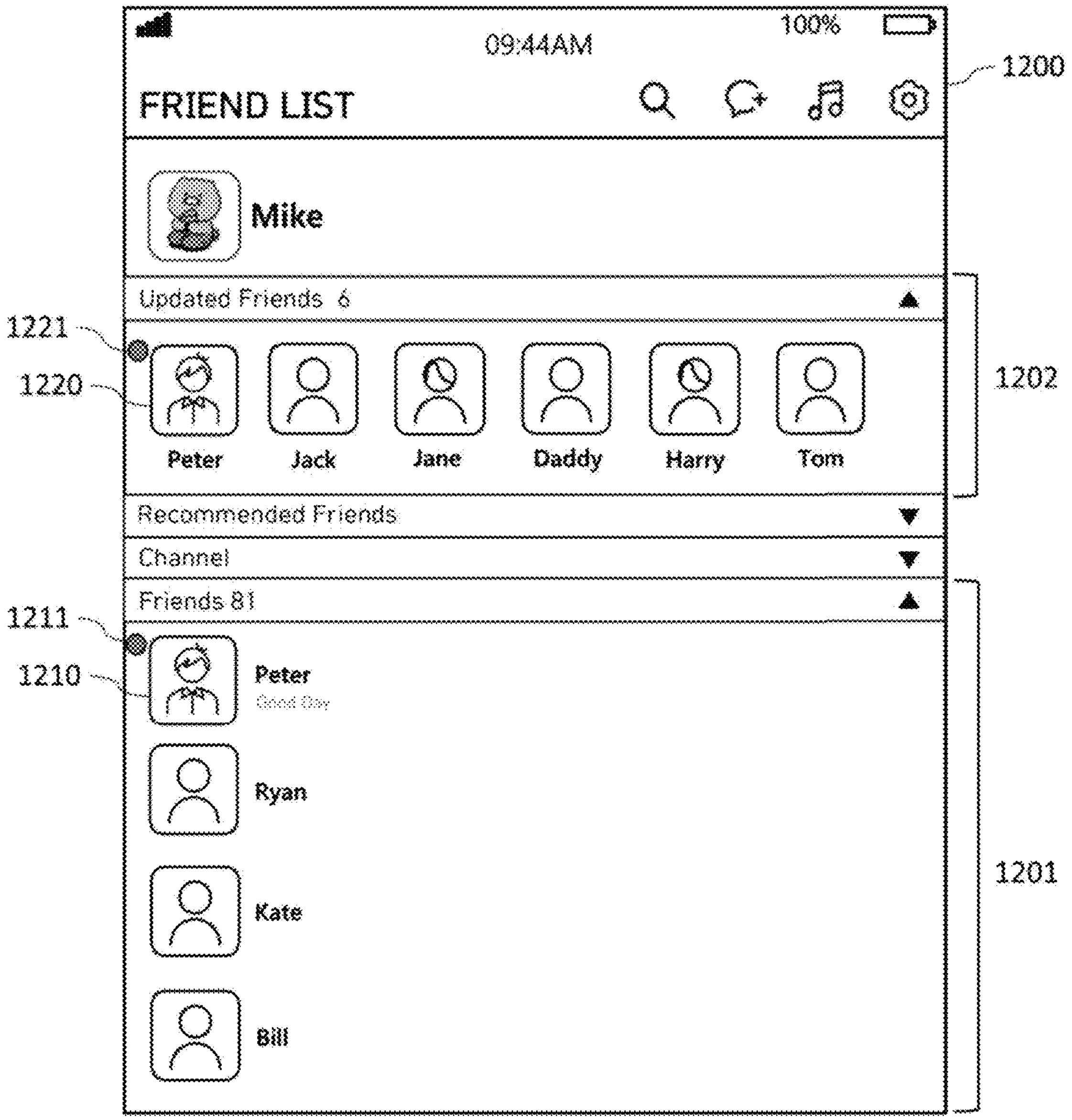
FIG. 12 exemplarily shows a screen in a process of receiving notification information about voting to a second user terminal or a third user terminal according to embodiments of the present disclosure.

FIG. 12 exemplarily shows a screen in the process of receiving notification information regarding a poll by the second user terminal 30 or the third user terminal 40 according to embodiments of the present disclosure.

In FIG. 12, it may be illustrated a screen where the second user terminal 30 receives notification information regarding a poll as the server 10 performs operation 1103 or operation 1109 of FIG. 11. The notification information in operation 1103 may be displayed in the same form as the notification information in operation 1109.

Referring to FIG. 12, the second user terminal 30 may display a friend list 1200 in a social media service or messenger service provided by the server 10. The friend list 1200 may include friend information 1201 of the second user's friends, and updated friend information 1202 of the second user's friends whose profiles have been updated.

When the server 10 provides a profile update notification for the first user to the second user terminal 30, the notification may be displayed as a notification icon 1211 to correspond to friend information 1201 of the first user within the friend information 1210 of the second user's friends. In addition, the profile update notification may be displayed corresponding to the first user among the updated friend information 1220 for the second user as a notification icon 1221.

The notification icons 1211 and 1221 may no longer be displayed after the second user interacts with the first user's profile pictures 1210 and 1220 and views the updated first user's profile screen.

The notification information in operation 1103 of FIG. 11 and the notification information in operation 1109 of operation 11 may be displayed in the same form. Accordingly, the second user terminal 30 may display a screen as shown in FIG. 12 after the server 10 performs each of operations 1103 and 1109 of FIG. 11.

However, depending on a policy of providing notification information associated with the end of the poll to a user, the third user terminal 40 may display different screens after the server 10 performs operations 1103 and 1109 of FIG. 11. Specifically, the third user terminal 40 may display a screen as shown in FIG. 12 after the server 10 performs operation 1103 of FIG. 11. However, after the server 10 performs operation 1109 of FIG. 11, the third user terminal 40 may display a screen like FIG. 12 only if the server 10 applies a policy of providing notification information associated with the end of the poll to users who did not participate in the poll.

Hereinafter, with reference to FIG. 13, an example of a method for providing a vote feature through a profile screen by the first user terminal 20 of the present disclosure will be described.

Figure 13:
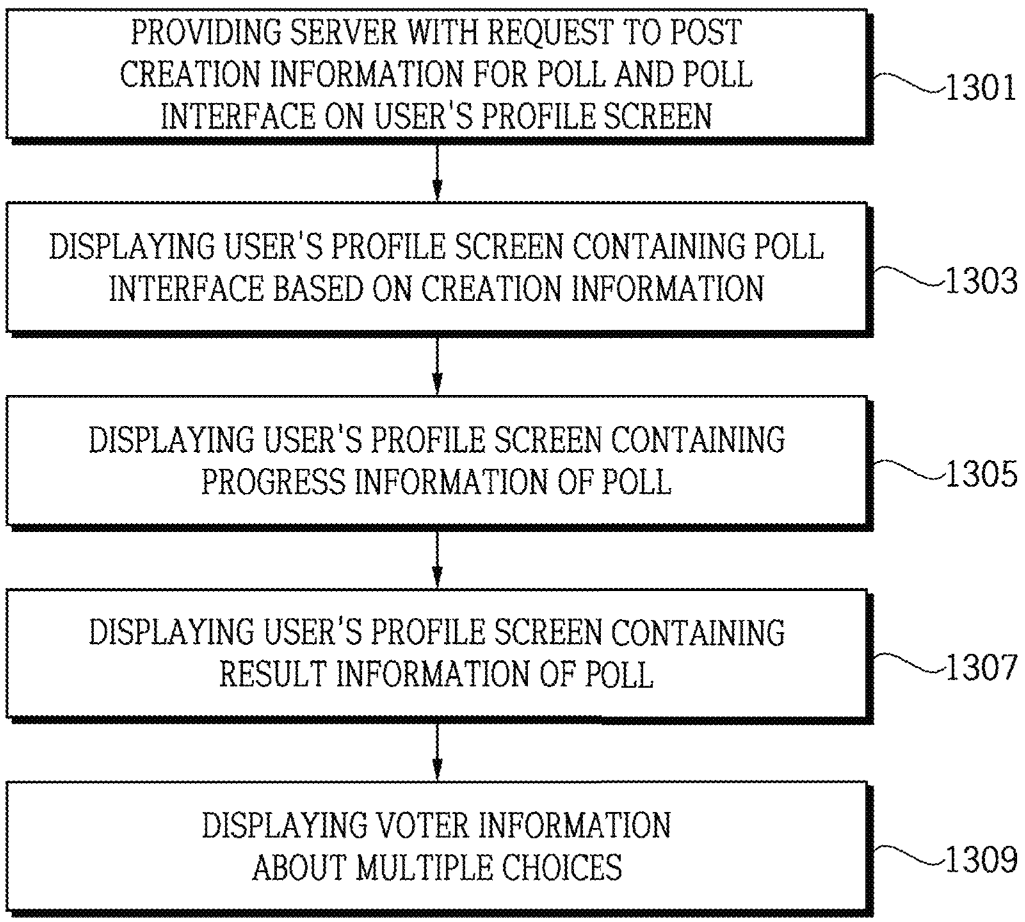
FIG. 13 is a flowchart for explaining how a first user terminal of the present disclosure provides a vote feature through a profile screen.

FIG. 13 is a flowchart for explaining how the first user terminal 20 of the present disclosure provides a vote feature through a profile screen.

In this embodiment, the first user corresponds to a poll creator. Therefore, the first user terminal 20 requests the server 10 to create and post a poll, and receives progress information and result information of the poll from the server 10.

The method for providing a vote feature through a profile screen by the first user terminal 20 is substantially identical to the method for providing a vote feature through a profile screen by the server 10 as described in FIGS. 2 to 12, with only the subject of execution being different. Therefore, for convenience of explanation, some of the content that is substantially identical to the content described in the method for providing a vote feature through a profile screen by the first user terminal 20 will be omitted in favor of the described method.

In operation 1301, the first user terminal 20 provides the server 10 with a request to post creation information for a poll and a poll interface on the first user's profile screen. Operation 1301 corresponds to operation 201 performed by the server 10. An example screen of the first user terminal 20 in operation 1301 is shown in FIG. 3.

In operation 1303, the first user terminal 20 displays the first user's profile screen containing the poll interface based on the creation information. Operation 1303 may be performed in response to a request to post the poll interface from the first user terminal 20 or a request to view the first user's profile screen from the first user terminal 20.

Operation 1303 is substantially identical to operation 203 performed by the server 10. While the server 10 provides the first user's profile screen containing a poll interface to the second user terminal 30 in operation 203 in operation 1303, the server 10 provides the first user's profile screen containing a poll interface to the first user terminal 20 in operation 1303.

In operation 1305, the first user terminal 20 displays the first user's profile screen containing progress information of the poll. Operation 1305 may be performed in response to an interaction by the first user to view the first user's profile screen during the poll.

Operation 1305 corresponds to operation 209 performed by the server 10. An example screen of the first user terminal 20 in operation 1305 is shown in FIG. 6.

After operation 1305 is performed, the first user terminal 20 may display voter information about multiple choices in response to an interaction input for viewing details about the progress information. An example screen where the first user terminal 20 displays the voter information regarding the progress information is shown in FIG. 7.

In operation 1307, the first user terminal 20 displays the first user's profile screen containing result information of the poll. Operation 1307 may be performed in response to an interaction input by the first user to view the first user's profile screen when the poll ends.

Operation 1307 corresponds to operation 213 performed by the server 10. An example screen of the first user terminal 20 in operation 1307 is shown in FIG. 8.

In operation 1309, the first user terminal 20 displays the voter information about the multiple choices. Operation 1309 may be performed in response to an interaction input by the first user to view details about the result information after operation 1307 is performed. Operation 1309 may only be performed within a predetermined period after the poll ends.

Operation 1309 corresponds to operation 215 performed by the server 10. An example screen of the first user terminal 20 in operation 1309 is shown in FIG. 9.

Hereinafter, with reference to FIG. 14, an example of a method for providing a vote feature through a profile screen by the second user terminal 30 of the present disclosure will be described.

Figure 14:
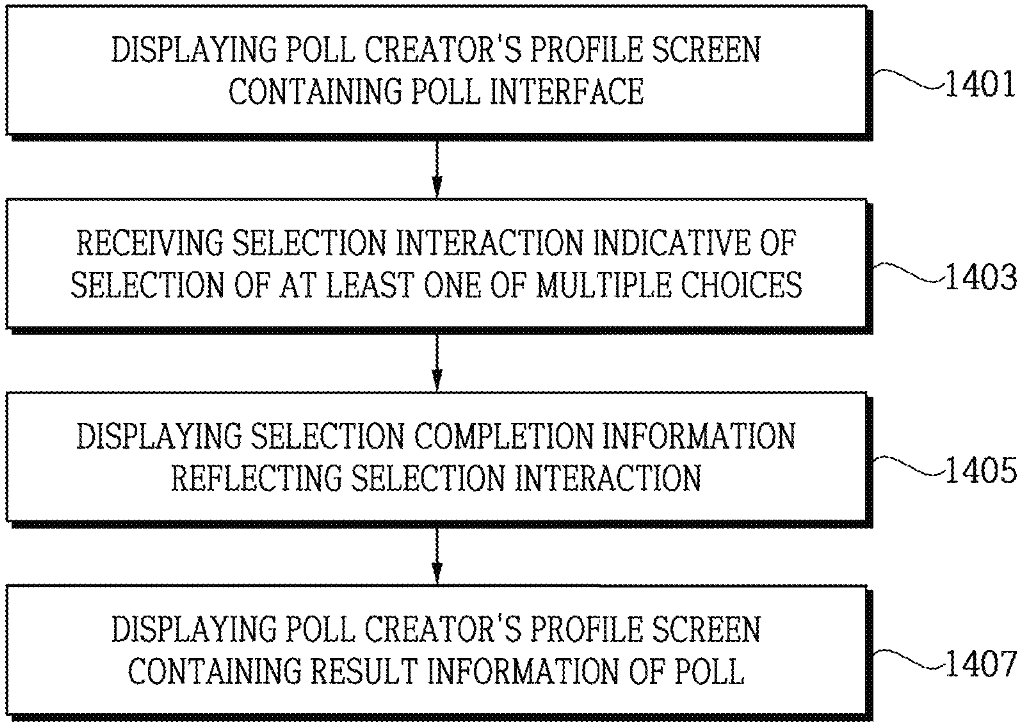
FIG. 14 is a flowchart for explaining how a second user terminal of the present disclosure provides a vote feature through a profile screen.

FIG. 14 is a flowchart for explaining how the second user terminal 30 of the present disclosure provides a vote feature through a profile screen.

In this embodiment, the second user corresponds to a poll participant. Therefore, the second user terminal 30 receives and displays a poll interface created and posted by a poll creator on the server 10, inputs a selection interaction with the poll interface, and receives selection completion and result information of the poll from the server 10.

The method for providing a vote feature through a profile screen by the second user terminal 30 is substantially identical to some of the method for providing a vote feature through a profile screen by the server as described in FIGS. 2 to 12, with only the subject of execution being different. Therefore, for convenience of explanation, some of the content that is substantially identical to the content described in the method for providing a vote feature through a profile screen by the second user terminal 30 will be omitted in favor of the described method.

In operation 1401, the second user terminal 30 displays a poll creator's profile screen containing a poll interface. Operation 1401 may be performed in response to an interaction input by the second user to view the first user's profile screen during the poll.

Operation 1401 corresponds to operation 203 performed by the server 10. An example screen of the second user terminal 30 in operation 1401 is shown in FIG. 4.

In operation 1403, the second user terminal 30 receives a selection interaction indicative of selection of at least one of multiple choices. Operation 1403 corresponds to operation 205 performed by the server 10.

In operation 1405, the second user terminal 30 displays selection completion information reflecting the selection interaction. Operation 1405 may be performed in response to the selection interaction input in operation 1403.

Operation 1405 corresponds to operation 207 performed by the server 10. An example screen of the second user terminal 30 in operation 1405 is shown in FIG. 5.

In operation 1407, the second user terminal 30 displays the poll creator's profile screen containing result information of the poll. Operation 1407 may be performed in response to an interaction input by the second user to view the first user's profile screen when the poll ends.

Operation 1407 corresponds to operation 217 performed by the server 10. An example screen of the second user terminal 30 in operation 1407 is shown in FIG. 10.

In the method for providing a vote feature through the profile screen of the present disclosure, it is possible to post a poll interface through a poll creator's profile screen and allow poll participants to participate in poll by accessing the profile screen of the poll creator.

In addition, in the method for providing a vote feature through a profile screen of the present disclosure, it is possible to efficiently provide other users with notification information associated with the creation of a poll and notification information associated with the end of the poll through a poll creator's profile screen.

The technical features disclosed in each embodiment of the present disclosure are not limited to a corresponding embodiment, and unless incompatible with each other, the technical features disclosed in each embodiment may be applied in combination to other embodiments.

Therefore, although each embodiment is described mainly about an individual technical feature, the technical features of the embodiments of the present disclosure may be applied in combination, unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims, and equivalents thereof.

What is claimed is:

1. A computer-implemented method executed by a server comprising one or more processors and a memory storing instructions, the method comprising:

receiving a request from a first user terminal to post creation information for a poll and a poll interface based on the creation information on a first user's profile screen, wherein the poll interface comprises multiple choices, and wherein the creation information includes information defining a position and size for placement of the poll interface within an editable area of the profile screen that do not overlap a profile picture area;

in response to a request to view the first user's profile screen from a second user terminal, providing the first user's profile screen containing the poll interface embedded in the editable area to the second user terminal;

receiving selection information indicative of selection of at least one of the multiple choices from the second user terminal;

providing, to the second user terminal, selection completion information that replaces the poll interface within the editable area in the same profile screen, such that the selection completion information is displayed in the second user terminal in the same size and position as the poll interface;

in response to a request to view the first user's profile screen from the first user terminal, providing the first user's profile screen containing progress information of the poll to the first user terminal, such that the progress information of the poll is displayed in the first user terminal in the same size and position as the poll interface; and when the poll ends, in response to a request to view the first user's profile screen from the first user terminal, providing the first user's profile screen containing the result information of the poll to the first user terminal, wherein the selection information is received from the second user terminal of a user who is logged into the server using a user account registered with the server.

2. The method of claim 1, wherein the selection completion information is displayed in place of the poll interface on the first user's profile screen.

3. The method of claim 1, wherein the creation information comprises at least one of a topic of the poll, information on multiple choices, a poll end point, or information on a position and size of the poll interface on the first user's profile screen.

4. The method of claim 1, further comprising:

in response to a request to view details about the result information from the first user terminal, providing voter information about the multiple choices to the first user terminal, wherein the voter information about the multiple choices is provided only within a predetermined period after the poll ends.

5. The method of claim 1, further comprising:

when the poll ends, in response to a request to view the first user's profile screen from a terminal of a user who is a friend with the first user, providing the first user's profile screen containing the result information of the poll to the terminal of the user.

6. The method of claim 1, further comprising:

when the poll ends, in response to a request to view the first user's profile screen from the second user terminal, providing the first user's profile screen containing the result information of the poll to the second user terminal; and when the poll ends, in response to a request to view the first user's profile screen from a third user terminal that did not participate in the poll, providing the first user terminal not containing the result information of the poll to the third user terminal.

7. The method of claim 1, further comprising:

after receiving the request to post the creation information for the poll and the poll interface, providing notification information associated with posting of the poll interface to a terminal of a user who is a friend with the first user.

8. The method of claim 6, wherein the notification information is provided in a form of a profile update notification for the first user.

9. The method of claim 1, wherein after receiving the request to post the creation information for the poll and the poll interface, notification information associated with a scheduled end of the poll is provided to a terminal of a user who is a friend with the first user and did not participate in the poll.

10. The method of claim 1, further comprising:

when the poll ends, providing notification information associated with the end of the poll to a terminal of at least one user who is a friend with the first user.

11. The method of claim 10, wherein the at least one user who is a friend with the first user is a user who has participated in the poll among users who are friends with the first user.

12. The method of claim 10, wherein the notification information is provided in a form of a profile update notification for the first user.

13. The method of claim 1, further comprising causing the first user terminal to set the size of the poll interface via a size setting interface.

14. The method of claim 1, further comprising causing the first user terminal to change the position of the poll interface by touching or clicking and dragging the poll interface.

* * * * *